US012677274B2

(12) United States Patent
Fu et al.

(10) Patent No.: US 12,677,274 B2
(45) Date of Patent: Jul. 7, 2026

(54) CG RESOURCE PROCESSING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 308 days.

(21) Appl. No.: 18/373,432

(22) Filed: Sep. 27, 2023

(65) Prior Publication Data

US 2024/0032028 A1        Jan. 25, 2024

Related U.S. Application Data

(63) Continuation of application No. PCT/CN2021/085055, filed on Apr. 1, 2021.

(51) Int. Cl.
*H04W 72/1268*        (2023.01)
*H04W 72/56*        (2023.01)

(52) U.S. Cl.
CPC ....... *H04W 72/1268* (2013.01); *H04W 72/56* (2023.01)

(58) Field of Classification Search
CPC ............. H04W 72/1268; H04W 72/56; H04W 72/115; H04W 72/23; H04L 1/1887; H04L 1/1893; H04L 1/1896; H04L 1/1822
See application file for complete search history.

(56) References Cited

U.S. PATENT DOCUMENTS

| | | | | |
|---|---|---|---|---|
| 11,470,624 B1* | 10/2022 | Babaei | ................. | H04W 72/23 |
| 2019/0075585 A1* | 3/2019 | Deogun | ............ | H04W 72/1268 |
| 2020/0229145 A1* | 7/2020 | Kang | .................... | H04W 72/02 |
| 2021/0105096 A1* | 4/2021 | Chin | .................... | H04L 1/1887 |
| 2022/0295540 A1* | 9/2022 | Tsai | .................... | H04W 72/23 |
| 2022/0338241 A1* | 10/2022 | Chin | .................... | H04L 1/1812 |

(Continued)

FOREIGN PATENT DOCUMENTS

| | | |
|---|---|---|
| CN | 111294139 A | 6/2020 |
| CN | 112189373 A | 1/2021 |

(Continued)

OTHER PUBLICATIONS

Extended European Search Report issued in corresponding European application No. 21934011.4, mailed Feb. 15, 2024.

(Continued)

*Primary Examiner* — Yuwen Pan
(74) *Attorney, Agent, or Firm* — BAYES PLLC

(57)        ABSTRACT

A configured grant (CG) resource processing method is disclosed. The method include: receiving first configuration information sent by a network device; and according to the first configuration information, determining a CG resource transmission mode and determining a CGT state. The first configuration information is used to indicate: configuring at least one CG resource; configuring a CGT; configuring LCH-based prioritization or not; configuring a CGRT; and configuring an autonomous transmission mechanism.

5 Claims, 3 Drawing Sheets network device terminal device 201.send first configuration informaiton 202. according to the first configuration information, determine a Configured Grant (CG) resource transmission mode, and/or determine a CG timer (CGT) state

(56) References Cited

U.S. PATENT DOCUMENTS

| | | | | |
|---|---|---|---|---|
| 2023/0058734 A1* | 2/2023 | Xiao | .................... | H04L 1/1822 |
| 2023/0111565 A1* | 4/2023 | Lee | ...................... | H04L 5/0055 |
| | | | | 370/329 |
| 2023/0129023 A1* | 4/2023 | Fu | ........................ | H04W 16/14 |
| | | | | 370/329 |
| 2025/0358804 A1* | 11/2025 | Fu | .................... | H04W 72/0453 |

FOREIGN PATENT DOCUMENTS

| | | | |
|---|---|---|---|
| CN | 112242888 A | 1/2021 |
| TW | 202110119 A | 3/2021 |
| WO | 2020215826 A1 | 10/2020 |
| WO | 2020223420 A1 | 11/2020 |

OTHER PUBLICATIONS

Source: InterDigital; Title: Summary of URLLC over unlicensed controlled environment; R2-2102087 3GPP RAN WG2 Meeting #113-e Jan. 25-Feb. 5, 2021.

Source: Qualcomm Incorporated; Title: CG Harmonization in Unlicensed Controlled Environments; R2-2100268 3GPP TSG-RAN WG2 Meeting #113e Jan. 25-Feb. 5, 2021.

Source: Huawei, HiSilicon; Title: Uplink enhancements for URLLC in UCE; R2-2100214 3GPP TSG-RAN WG2 Meeting #113-e Online, Jan. 25-Feb. 5, 2021.

First Office Action issued in corresponding Chinese Application No. 202180093425.X, mailed on Jan. 23, 2025, 18 pages.

International Search Report issued in International application No. PCT/CN2021/085055, mailed Nov. 9, 2021.

Written Opinion of the International Searching Authority issued in International application No. PCT/CN2021/085055, mailed Nov. 9, 2021.

3GPP TS 38.321 V16.3.0 (Dec. 2020); Technical Specification Group Radio Access Network; NR; Medium Access Control (MAC) protocol specification (Release 16).

3GPP TR 38.889 V16.0.0 (Dec. 2018); Technical Specification Group Radio Access Network; Study on NR-based access to unlicensed spectrum (Release 16).

Qualcomm Inc., "New WID on NR-based Access to Unlicensed Spectrum", RP-182878, 3GPP TSG RAN Meeting #82 Sorrento, Italy, Dec. 10-13, 2018.

3GPP TS 37.213 V17.6.0 (Jun. 2023); Technical Specification Group Radio Access Network; Physical layer procedures for shared spectrum channel access (Release 17).

Request for Priority Examination of Patent Application issued in corresponding Chinese Application No. 202180093425.X dated Sep. 23, 2024, 4 pages.

Communication pursuant to Article 94(3) EPC issued in corresponding European Application No. 21934011.4, dated Nov. 29, 2024, 12 pages.

* cited by examiner network device sending module
301

CG RESOURCE PROCESSING METHOD, TERMINAL DEVICE, AND NETWORK DEVICE

CROSS-REFERENCE TO RELATED APPLICATION

The present application is a continuation of International Application No. PCT/CN2021/085055, filed on Apr. 1, 2021, which is incorporated herein by reference in its entirety.

TECHNICAL FIELD

The present disclosure relates to the communication technical field, and more specifically, to a CG resource processing method, a terminal device and a network device.

BACKGROUND

When a network device indicates configuration(s) related to Configured Grant (CG) resource(s) for a terminal device, during CG resource transmission, if a deprioritized resource appears due to a resource conflict, for different CG resource related configurations, how to perform transmission of the deprioritized resource and the state of a corresponding CG timer cannot be determined at present. Therefore, it is an urgent problem to be solved to determine a transmission mode of a CG resource and the state of the CG timer for different CG resource related configurations of the network device.

SUMMARY

Embodiments of the present disclosure provide a CG resource processing method, a terminal device and a network device, which can determine the transmission mode of a CG resource and the state of a CG timer for different CG resource related configurations of the network device.

In a first aspect, there is provided a CG resource processing method, including:

receiving first configuration information sent by a network device; and according to the first configuration information, determining a Configured Grant (CG) resource transmission mode, and/or, determining a CG timer state.

In a second aspect, there is provided a resource processing method, including:

sending first configuration information to a terminal device, wherein the first configuration information is used for determining a CG resource transmission mode and/or determining a CG timer state.

In a third aspect, there is provided a terminal device, including:

a receiving module configured to receive first configuration information sent by a network device; and a processing module configured to, according to the first configuration information, determine a Configured Grant (CG) resource transmission mode, and/or determine a CG timer state.

In a fourth aspect, there is provided a network device, including:

a sending module configured to send first configuration information to a terminal device, wherein the first configuration information is used for determining a CG resource transmission mode, and/or determine a CG timer state.

In a fifth aspect, there is provided a terminal device, including:

a receiver configured to receive first configuration information sent by a network device; and a processor configured to, according to the first configuration information, determine a Configured Grant (CG) resource transmission mode, and/or determine a CG timer state.

In a sixth aspect, there is provided a network device, including:

a transmitter configured to send first configuration information to a terminal device, wherein the first configuration information is used for determining a CG resource transmission mode, and/or determine a CG timer state.

In a seventh aspect, there is provided a computer-readable storage medium, including computer instructions, which when run on a processor, cause the processor to implement the method as described in the first aspect above.

In an eighth aspect, there is provided a computer-readable storage medium, including computer instructions, which when run on a processor, cause the processor to implement the method as described in the second aspect above.

In a ninth aspect, there is provided a computer program product, including computer instructions; when the computer program product runs on a processor, the processor is caused to implement the method as described in the above first aspect.

In a tenth aspect, there is provided a computer program product, including computer instructions; when the computer program product runs on a processor, the processor is caused to implement the method described in the second aspect above.

In an eleventh aspect, there is provided a chip, and the chip is coupled to a memory in a terminal device, so that the chip invokes program instructions stored in the memory during operation to implement the method described in the first aspect above.

In a twelfth aspect, there is provided a chip, and the chip is coupled to a memory in a terminal device, so that the chip invokes program instructions stored in the memory during operation to cause the terminal device to implement the method described in the second aspect above.

In a twelfth aspect, there is provided a chip, and the chip is coupled to a memory in a network device, so that the chip invokes program instructions stored in the memory during operation to cause the network device to implement the method described in the second aspect above.

In the embodiments of the present disclosure, the terminal device can receive the first configuration information sent by the network device, and determine the CG resource transmission mode, and/or determine the state of the CG timer according to the first configuration information. In this way, the terminal device can determine the transmission mode for the CG resource and/or the state of the CG timer for different CG resource related configurations indicated by the network device.

DETAILED DESCRIPTION

Figure 1:
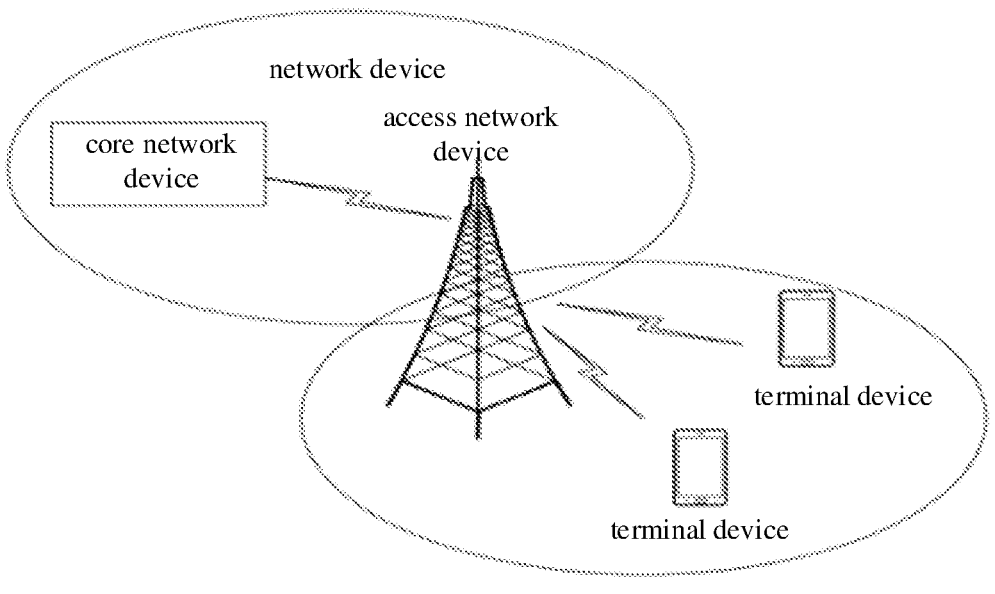
FIG. 1 is a schematic structural diagram of a communication system provided by an embodiment of the present disclosure.

The technical solutions in the embodiments of the present disclosure will be described below with reference to the accompanying drawings in the embodiments of the present disclosure. Obviously, the described embodiments are only some of the embodiments of the present disclosure, not all of them. Based on the embodiments of the present disclosure, all other embodiments obtained by those skilled in the art without creative efforts fall within the protection scope of the present disclosure.

The related technologies involved in the embodiments of the present disclosure and some terms are briefly described below:

1. Background on Ultra-Reliable and Low Latency Communications (URLLC)

5G Radio Access Network (RAN) 2 URLLC needs to support the transmission of services such as Factory automation, Transport Industry, and Electrical Power Distribution in the 5G system. In order to support the transmission of URLLC services, Configured Grant (CG) is enhanced, that is, multiple CG configurations are introduced, as well as the specific configuration and use of CG (such as supporting the slot-level period, supporting CG autonomous transmission, etc.) is enhanced.

R17 needs to consider supporting URLLC services in the interference-controlled new generation (communication system) unlicensed (New Radio Unlicensed, NRU) scenario.

(1) Enhanced use of NRU CG and URLLC CG may be considered in the NRU scenario (harmonizing UL configured-grant enhancements in NRU and URLLC introduced in Rel-16 to be applicable for unlicensed spectrum).

(2) The initial channel occupation time for user equipment which is frame based equipment (UE-initial COT for FBE), wherein FBE refers to Frame Based Equipment.

LBT defines two types of equipment, one is FBE, and the other is LBE (Load Based Equipment). For FBE, a period is set, and channel detection is performed at a fixed position in each period. For example, Clear Channel Assessment (CCA) detection is performed within each CCA detection time. If the channel status is detected to be idle, the channel can be occupied for transmission; if the channel status is detected to be non-idle, the device cannot occupy the channel in this period until it waits for a fixed position in the next period to continue detection.

2. CG Enhancement in URLLC

In order to support the high latency requirements of URLLC services, URLLC enhances the CG period to support any slot-level service period.

In order to support multiple URLLC services and high latency requirements of URLLC services, URLLC introduces multiple CGs. The Hybrid Autonomous Repeat Request (HARQ) processes for different CG configurations are different, and a HARQ process identity offset 2 (harqProcID-Offset2) is used to ensure that the processes of different CGs are different.

Due to occurrence of a conflict between a CG resource and other resource(s), in order to ensure that a Medium Access Control Protocol Data Unit (MAC PDU) packet that has been generated for the CG resource (i.e., a deprioritized MAC PDU) is not discarded/can be transmitted as soon as possible, autonomous transmission for CG is introduced. For the CG for which the MAC PDU packet has been generated and transmission cannot be performed due to resource conflict, a new transmission can be performed using a subsequent CG resource which is with the same HARQ process and belongs to the same CG configuration. The autonomous transmission is determined by an autonomous transmission mechanism (autonomousTx).

If physical layer priorities are different: there is a conflict between CG and CG, MAC may indicate one or more MAC PDUs to the physical layer. Similarly, if there is a conflict between data and uplink Scheduling Request (SR), MAC may also indicate SR and MAC PDU to the physical layer.

When a low-priority resource appears, Logical Channel (LCH)-based prioritization and autonomous transmission mechanism (autonomousTx) are configured, and a CG retransmission timer (CGRT) is stopped.

3. NRU Related Background

NR works in the unlicensed frequency band, which may include the following working scenarios:

Scenario A: carrier aggregation scenario. A Primary Cell (PCell) is a licensed spectrum, and a Secondary Cell (SCell) works aggregately on an unlicensed spectrum through carrier aggregation.

Scenario B: dual connectivity working scenario. The PCell is Long Term Evolution (LTE) licensed spectrum, PScell is NR unlicensed spectrum.

Scenario C: standalone working scenario. NR works as an independent cell in unlicensed spectrum.

Scenario D: NR single cell scenario. The uplink (UL) works in the licensed spectrum, and the downlink (DL) works in the unlicensed spectrum.

Scenario E: dual connectivity working scenario. The PCell is NR licensed spectrum, and PScell is NR unlicensed spectrum.

Generally speaking, the working frequency band of NRU is 5 GHz unlicensed spectrum and 6 GHz unlicensed spectrum. On the unlicensed spectrum, the design of the NRU should ensure fairness with other systems that already work on these unlicensed spectrums, such as Wireless Fidelity (WiFi). The principle of fairness is that the impact of NRU on systems already deployed on unlicensed spectrum (such as WiFi) cannot exceed the impact between these systems.

To ensure fair coexistence between systems on unlicensed spectrums, energy detection is agreed as a fundamental coexistence mechanism. The general energy detection mechanism is the Listen Before Talk (LBT) mechanism. The basic principle of this mechanism is as follows. Before a base station or a terminal (transmitting end) transmits data on the unlicensed spectrum, it needs to listen for a period of time according to regulations. If the listening result indicates that the channel is idle, the transmitting end can transmit data to the receiving end. If the listening result indicates that the channel is occupied, the transmitting end needs to back off for a period of time according to the regulations and then continue listening of the channel; the transmitting end cannot transmit data to the receiving end until the channel listening result is idle.

Currently, four channel access categories are defined in NRU, and reference can be made to TR 38.889:

Category 1: Immediate Transmission Category

The category is that a TX side may quickly transmit after a switching gap inside a Channel Occupancy Time (COT).

The switching gap is the trunaround time from reception to transmission, and the typical value is no more than 16 us.

Category 2: LBT Scheme without Random Back-Off

This scheme means that the duration of time that the channel is sensed by the UE is deterministic and is typically relatively short, e.g., 25 us.

Category 3: LBT Scheme with Random Back-Off (with a Contention Window of Fixed Size)

In the LBT procedure, the transmitting side randomly takes a random value in the contention window to determine the time to listen to the channel.

Category 4: LBT Scheme with Random Back-Off (with a Contention Window of Variable Size)

In the LBT procedure, the transmitting side randomly takes a random value in the contention window to decide the time to listen to the channel, and the contention window is variable.

In summary, for a terminal device, a base station needs to transmit data to the terminal device within the maximum channel occupancy time (MCOT). If the base station does not preempt a channel, that is, outside the MCOT time, the terminal device cannot receive the scheduling data sent by the base station to the terminal device.

4. CG Enhancement in NR-U (Hereinafter Also Written as NRU)

For flexible resource selection, a HARQ process of NRU CG is not calculated according to a formula, but is selected by a UE itself. For one CG resource, RRC configures one HARQ process set, and the UE can select one HARQ process in this set for this CG transmission. The specific configured HARQ process interval is determined by the HARQ process identity offset (harq-ProcID-Offset) and the number of HARQ processes (nrofHARQ-Processes).

In order to support back-to-back resource configuration, NRU introduces multiple CGs, where multiple CG configurations can share a HARQ process.

Furthermore, a CG retransmission timer (cg-RetransmissionTimer) is also introduced to support autonomous retransmission when CG resource transmission cannot be performed due to LBT failure. After the cg-RetransmissionTimer expires, if a CG timer (configuredGrantTimer, CGT) does not expire, the corresponding HARQ process can perform retransmission.

CG transmission can be interrupted by dynamic scheduling Downlink Control Information (DCI) and Downlink Feedback Information (DFI). The specific behaviors are shown in Table 1 below:

If a low-priority resource appears according to LCH-based prioritization, the CG retransmission timer (CGRT) is configured to be stopped.

5. Uplink LBT Failure in NRU

The uplink transmissions initiated by User Equipment (UE) mainly includes the following categories:

(1) Scheduling Request (SR): used to request an uplink resource;

(2) Physical Random Access Channel (PRACH) transmission: due to Random Access Channel (RACH) triggering, UE needs to send msg1;

(3) Physical Uplink Shared Channel (PUSCH) transmission: including uplink data transmission based on configured grant (CG) and uplink data transmission based on dynamic grant (DG);

(4) Physical layer signaling transmission: including Acknowledge (ACK)/Not Acknowledge (NACK) feedback, Channel Status Indicator (CSI) reporting, etc.;

On the unlicensed spectrum, before transmitting SR, PRACH or PUSCH, the UE needs to use LBT to detect whether the channel is available. If the channel is not available, that is, LBT fails, the UE needs to wait until a next transmission opportunity to perform LBT again. If LBT failure is detected, the MAC layer needs to be notified of the LBT failure information.

When the network device indicates Configured Grant (CG) resource related configuration(s) for a terminal device, in the process of CG resource transmission, if a deprioritized resource appears due to a resource conflict, for different CG resource-related configurations, how to perform transmission of the deprioritized resource and the state of the corresponding CG timer cannot be determined at present. For example:

1. In a case where LCH-based prioritization and CGRT are configured simultaneously and autonomousTX is not configured, if a resource conflict results in a deprioritized resource to appear, how to deal with the deprioritized resource at this time, and/or, the state of the corresponding CG timer is uncertain.

2. In a case where autonomousTX and CGRT are configured simultaneously, if a resource conflict results in a deprioritized resource to appear, how to deal with the deprioritized resource at this time, and/or, the state of the corresponding timer is uncertain.

In order to solve the above problem(s), an embodiment of the present disclosure provides a CG resource processing method, a terminal device, and a network device. The terminal device may receive the first configuration information sent by the network device; according to the first configuration information, determine a CG resource transmission mode, and/or, determine a CG timer state. The first configuration information is used to indicate at least one of the following: configuring at least one CG resource; con-

TABLE 1

|  | DFI indicates positive acknowledgment (DFI = ACK) | DFI indicates negative acknowledgment (DFI = NACK) | DFI indicates new transmission (DCI = new tx) | DFI indicates retransmission DCI = retx | CG timer expires |
|---|---|---|---|---|---|
| CG timer | Stop | No impact | Start/Restart | Start/Restart | None |
| CG retx timer | Stop | Stop | Stop | stop | Stop |

The CG retx timer in Table 1 refers to the CG retransmission timer (CGRT).

figuring the CG timer (CGT); configuring Logical Channel (LCH)-based prioritization, or, not configuring the LCH-based prioritization; configuring a CG retransmission timer (CGRT), or not configuring the CGRT; configuring an autonomous transmission mechanism, or not configuring the autonomous transmission mechanism. In this way, according to the first configuration information configured by the network device, the terminal device can determine the transmission mode for the CG resource and/or the state of the CG timer for different CG resource related configurations indicated by the network device.

FIG. 1 is a system architecture diagram of a communication system in which an embodiment of the present disclosure is applied. The communication system may include a network device, and the network device may be a device that communicates with a terminal device (or called a communication terminal, terminal). A network device can provide communication coverage for a specific geographic area, and can communicate with terminal devices located within the coverage area. FIG. 1 exemplarily shows one network device and two terminal devices. Optionally, the communication system may include multiple network devices and each network device may include other numbers of terminal devices within the coverage area, and embodiments of the present disclosure do not impose limitations on this. Optionally, the communication system may further include other network entities such as a network controller or a mobility management entity, which is not limited in embodiments of the present disclosure.

Embodiments of the present disclosure are described in combination with a network device and a terminal device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN).

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device may also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may further include an access network device and a core network device. That is, the wireless communication system also includes multiple core networks for communicating with the access network device. The access network device may be an evolved base station (evolutional node B, referred to as eNB or e-NodeB), a macro base station, a micro base station (also called "small base station"), a pico base station, an access point (AP), a Transmission point (TP) or a new generation base station (new generation Node B, gNodeB), and so on in a long-term evolution (LTE) system, a next-generation (mobile communication system) (next radio, NR) system or an authorized auxiliary access long-term evolution (LAA-LTE) system.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station (Evolutional Node B, eNB or eNodeB) in LTE, or a relay station or an access point, or a vehicle-mounted device, a wearable device, a network device (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device may provide services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that a device with a communication function in the network/system in the embodiments of the present disclosure may be called a communication device. Taking the communication system shown in FIG. 1 as an example, the communication device may include a network device and a terminal device with communication functions, and the network device and terminal device may be specific devices in the embodiments of the present disclosure, which will not be described in detail here; the communication device may also include other devices in the communication system, such as a network controller, a mobility management entity, or other network entity, which are not limited in the embodiments of the present disclosure.

The technical solutions of the embodiments of the present disclosure can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, an evolution system of NR system, LTE-based access to unlicensed spectrum (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the developments of communication technologies, mobile communication systems will not only support traditional communications, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the embodiments of the present disclosure may also be applied to these communication systems.

The communication system in the embodiments of the present disclosure may be applied to a Carrier Aggregation (CA) scenario, or may be applied to a Dual Connectivity (DC) scenario, or may be applied to a Standalone (SA) network deployment scenario.

It should be understood that the "indication/indicate" mentioned in the embodiments of the present application may be a direct indication/indicate, or may be an indirect indication/indicate, or may mean that there is an association relationship. For example, if A indicates B, it can mean that A directly indicates B, for example, B can be obtained through A; it can also mean that A indirectly indicates B, for example, A indicates C, and B can be obtained through C; it can also mean that there is an association relationship between A and B.

In the description of the embodiments of the present disclosure, the term "corresponding" may mean that there is a direct correspondence or an indirect correspondence between two objects, or that there is an association relationship between the two objects, or may mean a relationship such as indicating and being indicated, or configuring and being configured, and so on.

Optionally, the indication information in the embodiments of the present disclosure includes at least one of the following physical layer signaling, such as Downlink Control Information (DCI), Radio Resource Control (RRC) signaling, and Media Access Control Control Element (MAC CE).

Optionally, the higher layer parameter or higher layer signaling in the embodiments of the present disclosure include at least one of: Radio Resource Control (RRC) signaling and Media Access Control Control Element (MAC CE). Specifically, it may be CG configuration (Config-uredgrantconfig), and/or MAC cell group configuration (MAC-CellGroupConfig).

Figure 2:
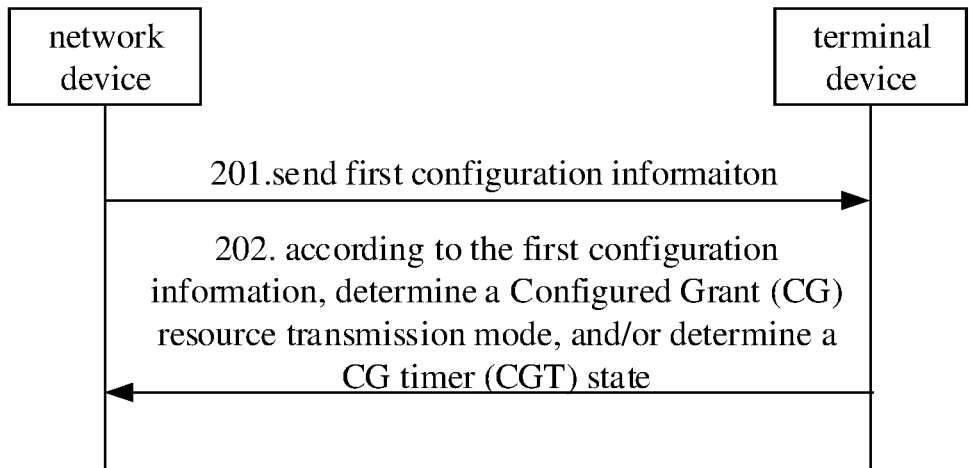
FIG. 2 is a schematic diagram of a CG resource processing method provided by an embodiment of the present disclosure.

As shown in FIG. 2, an embodiment of the present disclosure provides a CG resource processing method, including:

In 201, a network device sends first configuration information to a terminal device.

The first configuration information is used to indicate at least one of the following:

configuring at least one CG resource;

configuring a CGT;

configuring Logical Channel (LCH)-based prioritization, or not configuring LCH-based prioritization;

configuring a CG retransmission timer (CGRT), or not configuring the CGRT; or configuring an autonomous transmission mechanism, or not configuring the autonomous transmission mechanism.

In 202, according to the first configuration information, the terminal device determines a CG resource transmission mode, and/or determines a CG timer (CGT) state.

Optionally, if the first CG resource is a deprioritized resource, according to the first configuration information, the CG resource transmission mode is determined, and/or the CGT state is determined.

The first CG resource is one CG resource in at least one CG resource.

Optionally, the first CG resource being the deprioritized resource may include the following cases:

Case 1: the first CG resource is determined to be a deprioritized CG resource due to LCH-based prioritization.

Case 2: the first CG resource is determined to be a deprioritized CG resource due to a cancellation indication Radio Network Temporary Identifier (CI-RNTI) value.

Case 3: the first CG resource is determined to be a deprioritized CG resource due to a conflict between the first CG resource and a high-priority Physical Uplink Control Channel (PUCCH) resource.

Case 4: the first CG resource is determined to be a deprioritized CG resource due to a conflict between the first CG resource and a high-priority PUSCH.

Case 5: the first CG resource is determined to be a deprioritized CG resource due to a priority indication from a physical layer.

In the embodiments of the present disclosure, for different implementations of the first configuration information, the implementations of determining the CG resource transmission mode, and/or determining the CGT state are also different, and some possible implementations will be described below.

In the embodiments of the present disclosure, sometimes the CG resource is also referred to as CG.

First Implementation:

The first configuration information is used to indicate:

configuring the CGT;

configuring the LCH-based prioritization;

configuring the CGRT; and not configuring the autonomous transmission mechanism.

Second Implementation:

The first configuration information is used to indicate:

configuring the CGT;

configuring the LCH-based prioritization;

configuring the CGRT; and configuring the autonomous transmission mechanism.

For the above first implementation and second Implementation, there are several ways to determine the CG resource transmission mode, and/or determine the CG timer (CGT) state as follows:

In an optional implementation: if the first CG resource is a deprioritized resource, determining the CGT state according to the first configuration information includes but not limited to any one of the following (1) to (5):

(1) If the first CG resource is the deprioritized resource, the CGT is stopped.

Optionally, as involved in the embodiments of the present disclosure, the first CG resource may indicate a time domain resource at a time domain position, or a time-frequency domain resource.

Optionally, as involved in the embodiments of the present disclosure, the first CG resource may indicate a CG bundle or a CG resource at a partial time domain position in the CG bundle, or a partial time-frequency domain resource.

(2) The first CG resource belongs to a first CG resource group, and if the first CG resource is the deprioritized resource, the CGT is stopped.

In the embodiments of the present disclosure, the involved CG resource group refers to a CG bundle, and a CG bundle is CG resources including multiple time domain positions.

(3) If the first CG resource is the deprioritized resource and a first condition is satisfied, the CGT is stopped.

In the embodiments of the present disclosure, the involved first condition includes but is not limited to at least one of the following that:

a MAC PDU is obtained, there is at least one corresponding PUSCH that is not completely transmitted, and there is no corresponding PUSCH that is completely transmitted.

Optionally, in some cases, the first condition may further include: the first CG resource being a deprioritized resource.

In embodiments of the present disclosure, a deprioritized resource may be understood as a resource which is deprioritized.

The first CG resource being the deprioritized resource may include but not limited to the following cases:

Case 1: the first CG resource is determined to be a deprioritized CG resource due to LCH-based prioritization.

Case 2: the first CG resource is determined to be a deprioritized CG resource due to a cancellation indication Radio Network Temporary Identifier (CI-RNTI) value.

Case 3: the first CG resource is determined to be a deprioritized CG resource due to a conflict between the first CG resource and a high-priority Physical Uplink Control Channel (PUCCH) resource.

Case 4: the first CG resource is determined to be a deprioritized CG resource due to a conflict between the first CG resource and a high-priority PUSCH.

Case 5: the first CG resource is determined to be a deprioritized CG resource due to a priority indication from a physical layer.

(4) If the first CG resource is the deprioritized resource, the CGT is not stopped.

(5) If the first CG resource is the deprioritized resource and the first CG resource belongs to the first CG resource group, the CGT is not stopped.

In an optional implementation: if the first CG resource is a deprioritized resource, determining the CG resource transmission mode according to the first configuration information includes but is not limited to any one of the following (A) to (H):

(A) If the first CG resource is the deprioritized resource, a new MAC PDU packet is generated, and a new transmission of the new MAC PDU packet is performed through a second CG resource.

In an embodiment of the present disclosure, the time domain position of the involved second CG resource is after the first CG resource, and the second CG resource is associated with the same first HARQ process as the first CG resource; or, the time domain position of the involved second CG resource is after the first CG resource, and the data/MAC PDU of the first HARQ process associated with the first CG resource may be transmitted through the second CG resource or a second HARQ process corresponding to the second resource.

(B) The first CG resource belongs to the first CG resource group, and if the first CG resource is the deprioritized resource, a MAC PDU packet is generated, and a new transmission of the new MAC PDU packet is performed through the second CG resource.

(C) The first CG resource belongs to the first CG resource group, and if the first CG resource is the deprioritized resource, a new MAC PDU packet is generated, and a new transmission of the new MAC PDU packet is performed through the second CG resource, and an existing deprioritized MAC PDU is retransmitted through other CG resource.

In an embodiment of the present disclosure, the involved other CG resource are is a resource other than the first CG resource in the first CG resource group.

Optionally, another possible situation is that: the first CG resource belongs to the first CG resource group, and if the first CG resource is the deprioritized resource, a new MAC PDU packet is generated, and a new transmission of the new MAC PDU packet is performed through the second CG resource, and the transmission of other CG resource(s) is not performed.

Optionally, another possible situation is that: the first CG resource belongs to the first CG resource group, and if the first CG resource is the deprioritized resource, a new MAC PDU packet is generated, and a new transmission of the new MAC PDU packet is performed through a second CG bundle.

The time domain position of the second CG bundle involved in embodiments of the present disclosure is after the first CG bundle, and the second CG bundle is associated with the same HARQ process as the first CG bundle, or data/MAC PDU of the first HARQ process associated with the first CG bundle may be transmitted through the second HARQ process corresponding to the second CG bundle.

Regarding the transmission mode of the CG resource group (that is, the CG bundle) involved in the embodiments of the present disclosure, the above possible situations are all applicable, and the description will not be repeated later.

(D) If the first CG resource is the deprioritized resource and a first condition is satisfied, a new transmission is performed through the second CG resource. The first condition includes but is not limited to at least one of the following that: a MAC PDU is obtained, there is at least one corresponding PUSCH that is not completely transmitted, and there is no corresponding PUSCH that is completely transmitted;

Optionally, the new transmission involved in the embodiments of the present disclosure may refer to a new transmission of a new MAC PDU packet, or may refer to a new transmission similar to Industrial Internet of Things (IIoT)/

URLLC autonomous transmission, or the new transmission may refer to a new transmission of IIoT/URLLC autonomous transmission.

(E) If the first CG resource is the deprioritized resource and the first condition is satisfied, a new transmission is performed through the second CG resource; the new transmission is IIoT/URLLC autonomous transmission.

(F) If the first CG resource is the deprioritized resource, NRU autonomous retransmission is performed through the second CG resource.

(G) The first CG resource belongs to the first CG resource group, and if the first CG resource is the deprioritized resource, for the first CG resource, NRU autonomous retransmission is performed through the second CG resource.

(H) The first CG resource belongs to the first CG resource group, and if the first CG resource is the deprioritized resource, for the first CG resource, NRU autonomous retransmission is performed through the second CG resource, and an existing deprioritized MAC PDU is retransmitted through other CG resource.

Optionally, if the first HARQ process is in a pending state and the first HARQ process is a HARQ process associated with the first CG resource and the second CG resource, determining the CG resource transmission mode according to the first configuration information if the first CG resource is the deprioritized resource may specifically be the following manners in above (A) to (H):

(A) If the first CG resource is the deprioritized resource, a new MAC PDU packet is generated, and a new transmission of the new MAC PDU packet is performed through the second CG resource.

(D) If the first CG resource is the deprioritized resource and the first condition is satisfied, a new transmission is performed through the second CG resource. The first condition includes but is not limited to at least one of the following that: a MAC PDU is obtained, there is at least one corresponding PUSCH that is not completely transmitted, and there is no corresponding PUSCH that is completely transmitted.

(E) If the first CG resource is the deprioritized resource and the first condition is satisfied, a new transmission is performed through the second CG resource; the new transmission is IIoT/URLLC autonomous transmission.

(F) If the first CG resource is the deprioritized resource, NRU autonomous retransmission is performed through the second CG resource.

(G) The first CG resource belongs to the first CG resource group, and if the first CG resource is the deprioritized resource, for the first CG resource, NRU autonomous retransmission is performed through the second CG resource.

(H) The first CG resource belongs to the first CG resource group, and if the first CG resource is the deprioritized resource, for the first CG resource, NRU autonomous retransmission is performed through the second CG resource, and an existing deprioritized MAC PDU is retransmitted through other CG resource.

Optionally, if the first HARQ process is in a not pending state, and the first HARQ process is a HARQ process associated with the first CG resource and the second CG resource, determining the CG resource transmission mode according to the first configuration information if the first CG resource is the deprioritized resource may specifically be the following manners in above (A) to (H):

(A) If the first CG resource is the deprioritized resource, a new MAC PDU packet is generated, and a new transmission of the new MAC PDU packet is performed through the second CG resource.

(B) The first CG resource belongs to the first CG resource group, and if the first CG resource is the deprioritized resource, a new MAC PDU packet is generated, and a new transmission of the new MAC PDU packet is performed through the second CG resource;

the first CG resource belongs to the first CG resource group, and if the first CG resource is the deprioritized resource, a new MAC PDU packet is generated, and a new transmission of the new MAC PDU packet is performed through the second CG resource, and an existing deprioritized MAC PDU is retransmitted through the other CG resource.

(D) If the first CG resource is the deprioritized resource and the first condition is satisfied, a new transmission is performed through the second CG resource.

(E) If the first CG resource is the deprioritized resource and the first condition is satisfied, a new transmission is performed through the second CG resource; the new transmission is IIoT/URLLC autonomous transmission.

(F) If the first CG resource is the deprioritized resource, NRU autonomous retransmission is performed through the second CG resource.

(G) The first CG resource belongs to the first CG resource group, and if the first CG resource is the deprioritized resource, for the first CG resource, NRU autonomous retransmission is performed through the second CG resource.

(H) The first CG resource belongs to the first CG resource group, and if the first CG resource is the deprioritized resource, for the first CG resource, NRU autonomous retransmission is performed through the second CG resource, and an existing deprioritized MAC PDU is retransmitted through the other CG resource.

In another optional implementation: determining the CG resource transmission mode according to the first configuration information if the first CG resource is the deprioritized resource includes but is not limited to any one of the following 1) to 11):

1) If the first CG resource is the deprioritized resource and the CGT is stopped, for the first CG resource, a new MAC PDU packet is generated, and a new transmission of the new MAC PDU packet is performed through the second CG resource.

The time domain position of the second CG resource involved in embodiments of the present disclosure is after the first CG resource, and the second CG resource is associated with the same first HARQ process as the first CG resource; or, the time domain position of the second CG resource involved in embodiments of the present disclosure is after the first CG resource, and the data/MAC PDU of the first HARQ process associated with the first CG resource may be transmitted through the second HARQ process corresponding to the second CG resource.

Optionally, determining the CGT and the CG resource transmission mode may be: if the first CG resource is the deprioritized resource, the CGT is stopped, and for the first CG resource, a new MAC PDU packet is generated, and a new transmission of the new MAC PDU packet is performed through the second CG resource; wherein the time domain position of the second CG resource is after the first CG resource, and the second CG resource is associated with the same first HARQ process as the first CG resource.

Optionally, in the new transmission involved in the embodiments of the present disclosure, generating a new MAC PDU packet may refer to generation of new data packet (that is, different from the data in the previous deprioritized MAC PDU packet), or it may refer to regeneration of the deprioritized MAC PDU packet. It should be noted that this new transmission mode is applicable to all explanations herein involving generating of new MAC PDU packet, and will not be repeated.

It should be noted that, in embodiments of the present disclosure, the sequence between determining that the first CG resource is a deprioritized resource and determining the CGT state is not limited, that is, that the first CG resource is a deprioritized resource may be determined first, and then the CGT state (stop the CGT or not) may be determined; or, the CGT state may be determined first, and then that the first CG resource is a deprioritized resource may be determined.

It should be noted that in the embodiments of the present disclosure, the sequence between determining the CG resource transmission mode (such as the second CG resource transmission mode) and determining the CGT state may not be limited, that is, the CG resource transmission mode may be determined first, and then the CGT state (stop CGT or not stop CGT) may be determined; or, the CGT state may be determined first, and then the CG resource transmission mode may be determined. Optionally, for the former, the CG resource transmission mode may be independent of the CGT state. Optionally, for the latter, the CG resource transmission mode may be related to the CGT state.

It should be noted that, in an embodiment of the present disclosure, the CGRT state (may include stopping the CGRT or not stopping the CGRT) may also be determined according to the first configuration information. Moreover, the embodiments of the present disclosure do not limit the sequence between determination of the CG resource transmission mode, determination of the CGT state, and determination of the CGRT state, that is, the sequence among the three determinations can be set arbitrarily.

2) The first CG resource belongs to the first CG resource group, and if the first CG resource is the deprioritized resource and CGT is stopped, a new MAC PDU packet is generated, and a new transmission of the new MAC PDU packet is performed through the second CG resource.

Optionally, the method of determining the CGT and CG resource transmission mode may be as follows: the first CG resource belongs to the first CG resource group, and if the first CG resource is the deprioritized resource, the CGT is stopped and a new MAC PDU packet is generated, and a new transmission of the new MAC PDU packet is performed through the second CG resource.

3) The first CG resource belongs to the first CG resource group, and if the first CG resource is the deprioritized resource and the CGT is stopped, a new MAC PDU packet is generated, and a new transmission of the new MAC PDU packet is performed through the second CG resource, and an existing deprioritized MAC PDU is retransmitted through other CG resource; wherein the other CG resource is a resource other than the first CG resource in the first CG resource group.

Optionally, the method of determining the CGT and CG resource transmission mode may be as follows: the first CG resource belongs to the first CG resource group, and if the first CG resource is the deprioritized resource, the CGT is stopped and a new MAC PDU packet is generated, and a new transmission of the new MAC PDU packet is performed through the second CG resource, and an existing deprioritized MAC PDU is retransmitted through other CG resource;

wherein the other CG resource is a resource other than the first CG resource in the first CG resource group.

The other CG resource involved in embodiments of the present disclosure is a resource other than the first CG resource in the first CG resource group.

Optionally, another possible situation is that: the first CG resource belongs to the first CG resource group, and if the first CG resource is the deprioritized resource, a new MAC PDU packet is generated, and a new transmission of the new MAC PDU packet is performed through the second CG resource, and transmission of the other CG resource is not performed.

Optionally, another possible situation is that: the first CG resource belongs to the first CG resource group, and if the first CG resource is the deprioritized resource, a new MAC PDU packet is generated, and a new transmission of the new MAC PDU packet is performed through the second CG bundle.

The time domain position of the second CG bundle is after the first CG bundle, and the second CG bundle is associated with the same HARQ process as the first CG bundle, or the data/MAC PDU of the first HARQ process associated with the first CG bundle may be transmitted through the second HARQ process corresponding to the second CG bundle.

4) If the first CG resource is the deprioritized resource, and the first condition is satisfied, and the CGT is not stopped, a new transmission is performed through the second CG resource. The first condition includes but is not limited to at least one of the following that: a MAC PDU is obtained, and there is no corresponding PUSCH that is completely transmitted.

Optionally, determining the CGT and CG resource transmission mode may be as follows: if the first CG resource is the deprioritized resource and the first condition is satisfied, the CGT is not stopped and a new transmission is performed through the second CG resource. The first condition includes but is not limited to at least one of the following that: a MAC PDU is obtained, there is at least one corresponding PUSCH that is not completely transmitted, and there is no corresponding PUSCH that is completely transmitted. It should be noted that, in embodiments of the present disclosure, there is no limit to the sequence of determining that the first CG resource is a deprioritized resource, determining the CGT state (stopping CGT or not stopping CGT), and determining that the first condition is satisfied, that is, the sequence of the three determinations can be set arbitrarily.

It should be noted that, in the embodiments of the present disclosure, there is no limit to the sequence between determining the second CG resource transmission mode, determining the CGT state (stopping CGT or not stopping CGT), and determining that the first condition is satisfied, that is, the sequence of the three determinations can be set arbitrarily.

5) If the first CG resource is the deprioritized resource and the first condition is satisfied and the CGT is not stopped, a new transmission is performed through the second CG resource; the new transmission is IIoT/URLLC autonomous transmission.

Optionally, determining of the CGT and CG resource transmission mode may be: if the first CG resource is the deprioritized resource and the first condition is satisfied, the CGT is not stopped, and a new transmission is performed through the second CG resource; the new transmission is IIoT/URLLC autonomous transmission.

6) If the first CG resource is the deprioritized resource and the CGT is stopped, NRU autonomous retransmission is performed through the second CG resource.

Optionally, determining of the CGT and CG resource transmission mode may be: if the first CG resource is the deprioritized resource, the CGT is stopped, and NRU autonomous retransmission is performed through the second CG resource.

7) If the first CG resource is the deprioritized resource and the CGT is not stopped, NRU autonomous retransmission is performed through the second CG resource.

Optionally, determining of the CGT and CG resource transmission mode may be: if the first CG resource is the deprioritized resource, the CGT is not stopped, and NRU autonomous retransmission is performed through the second CG resource.

8) The first CG resource belongs to the first CG resource group, and if the first CG resource is the deprioritized resource and the CGT is stopped, for the first CG resource, NRU autonomous retransmission is performed through the second CG resource.

Optionally, determining of the CGT and CG resource transmission mode may be as follows: the first CG resource belongs to the first CG resource group, and if the first CG resource is the deprioritized resource, the CGT is stopped, and for the first CG resource, NRU autonomous retransmission is performed through the second CG resource.

9) The first CG resource belongs to the first CG resource group, and if the first CG resource is the deprioritized resource and CGT is stopped, then for the first CG resource, NRU autonomous retransmission is performed through the second CG resource, and an existing deprioritized MAC PDU is retransmitted through the other CG resource.

Optionally, determining of the CGT and CG resource transmission mode may be as follows: the first CG resource belongs to the first CG resource group, and if the first CG resource is the deprioritized resource, the CGT is stopped, and for the first CG resource, NRU autonomous retransmission is performed through the second CG resource, and an existing deprioritized MAC PDU is retransmitted through other CG resource.

10) The first CG resource belongs to the first CG resource group, and if the first CG resource is the deprioritized resource and the CGT is not stopped, for the first CG resource, NRU autonomous retransmission is performed through the second CG resource.

Optionally, determining of the CGT and CG resource transmission mode may be as follows: the first CG resource belongs to the first CG resource group, and if the first CG resource is the deprioritized resource, the CGT is not stopped, and for the first CG resource, NRU autonomous retransmission is performed through the second CG resource.

11) The first CG resource belongs to the first CG resource group, and if the first CG resource is the deprioritized resource and the CGT is not stopped, then for the first CG resource, NRU autonomous retransmission is performed through the second CG resource, and an existing deprioritized MAC PDU is retransmitted through the other CG resource.

Optionally, determining of the CGT and CG resource transmission mode may be as follows: the first CG resource belongs to the first CG resource group, and if the first CG resource is the deprioritized resource, the CGT is not stopped, and for the first CG resource, NRU autonomous retransmission is performed through the second CG resource, and an existing deprioritized MAC PDU is retransmitted through other CG resource.

Optionally, any one of the above (1) to (5), any one of the above (A) to (H), or any one of the above 1) to 11) may be determined in a case where a new transmission is performed through the first CG resource.

Optionally, any one of the CGT states in (1) to (5) above may be determined for a case of retransmission through the first CG resource.

Optionally, for the case of retransmission through the first CG resource, the following manners in above (A) to (H) may also be determined:

(A) If the first CG resource is the deprioritized resource, a new MAC PDU packet is generated, and a new transmission of the new MAC PDU packet is performed through the second CG resource.

(D) If the first CG resource is the deprioritized resource and the first condition is satisfied, a new transmission is performed through the second CG resource.

(E) If the first CG resource is the deprioritized resource and the first condition is satisfied, a new transmission is performed through the second CG resource, and the new transmission is IIoT/URLLC autonomous transmission.

(F) If the first CG resource is the deprioritized resource, NRU autonomous retransmission is performed through the second CG resource.

(G) The first CG resource belongs to the first CG resource group, and if the first CG resource is the deprioritized resource, for the first CG resource, NRU autonomous retransmission is performed through the second CG resource.

(H) The first CG resource belongs to the first CG resource group, and if the first CG resource is the deprioritized resource, then for the first CG resource, NRU autonomous retransmission is performed through the second CG resource, and an existing deprioritized MAC PDU is retransmitted through the other CG resource.

Optionally, for the case of retransmission through the first CG resource, 1) of the above 1) to 11), or any one of 4) to 11) may also be determined.

The specific implementations for the first implementations above is as follows:

In step 1: gNB (that is, network device) allocates CG resources to UE (that is, terminal device). While configuring CG resources, the following parameters can be included:

configuring the CGT;

configuring the LCH-based prioritization;

configuring the CGRT; and not configuring the autonomousTX.

In step 2: UE performs transmission using resources allocated by the network, and determines the state of a timer. Specifically, when a CG resource is a deprioritized resource (for example, the CG resource is considered a deprioritized resource due to a conflict, and a valid assembled MAC PDU is generated for the CG resource at this time) PDU), UE performs processing according to the following table.

For example, when a new transmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource, a new packet is generated according to a new transmission, or NRU is autonomous transmission is performed.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is not stopped (the state remains unchanged). Correspondingly, for a next available CG resource (in the case of CGT timeout), transmission is performed according to NRU autonomous transmission.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource (in the case of CGT timeout), the MAC PDU for the deprioritized CG resource is discarded, and a packet is generated for a new transmission.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource (in the case of CGT timeout), retransmission is performed, or autonomous transmission similar to IIoT autonomous transmission (it is considered that transmission of at least one corresponding PUSCH is completed) is performed.

In an embodiment of the present disclosure, a conflict refers to a resource conflict. Optionally, the conflict may specifically refer to a resource conflict in the time domain, or a resource conflict in the time-frequency domain.

As a possible implementation, the state of the timer in the table may be determined according to the deprioritized CG resource and/or the HARQ process state. The resource transmission mode may be determined according to at least one of: the deprioritized CG resource, the HARQ process state, and timer state. The resource transmission mode may also be determined in other ways, which are not limited in embodiments of the present disclosure.

TABLE 2

| conditions: configuring LCH-based prioritization, configuring the CGRT, not configuring the autonomousTX, and the CG resource being a deprioritized resource (e.g., the CG resource is considered as a deprioritized resource due to a conflict) | | resource transmission mode (for a subsequent CG, or CG bundle) | timer state |
|---|---|---|---|
| new transmission (using CG resource) | HARQ process (pending state) | new transmission, and generate a new MAC PDU packet | stop CGT (LBT can succeed or fail at this time) |
| | | new transmission, and transmission is performed in a manner similar to autonomous transmission (autoTX). (That is to say, a new transmission is performed, in a case where at least one of the following is satisfied: a MAC PDU is obtained, the previous CG resource is deprioritized, and there is no corresponding PUSCH that is completely transmitted) | stop CGT (LBT can succeed or fail at this time) |
| | | retransmission, retransmission is performed according to NRU autonomous retransmission (if CG is a bundle, for other time domain or time-frequency domain positions or repetition in the bundle other than the new transmission, processing is performed still according to the current bundle, that is, an existing deprioritized MAC PDU is transmitted) | stop CGT (LBT can succeed or fail at this time) |
| | | retransmission, retransmission is performed according to NRU autonomous retransmission (if the CG is a bundle, for other repetitions in the bundle except the new transmission, processing is performed still according to the current bundle, that is, an existing deprioritized MAC PDU is transmitted) | not stop CGT (LBT can succeed or fail at this time) |
| | HARQ process (not pending) | new transmission, a new MAC PDU packet is generated (if the CG is a bundle, for other repetitions in the bundle except the new transmission, processing is performed still | stop CGT (LBT can succeed or fail at this time) |

TABLE 2-continued

| | | | |
|---|---|---|---|
| | | according to the current bundle, that is, an existing deprioritized MAC PDU is transmitted) | |
| | | new transmission, transmission is performed in a manner similar to autoTX (that is, a MAC PDU is obtained, the previous CG resource is deprioritized, and no corresponding PUSCH is completely transmitted) | stop CGT (LBT can succeed or fail at this time) |
| | | retransmission, retransmission is performed according to NRU autonomous retransmission (if the CG is a bundle, for other repetitions in the bundle except this new transmission, processing is performed still according to the current bundle, that is, and existing deprioritized MAC PDU is transmitted) | not stop CGT (LBT can succeed or fail at this time) |
| retransmission (using CG resource and caused by, such as LBT failure, not receiving DFI-ACK, etc.; such as retransmission in bundle; for the current CG resource (such as the deprioritized resource), CGT is already running) | HARQ process is in not pending state. Note: if the CG is a bundle, for repetitions for other retransmission, retransmission is processed according to the current bundle (that is, for other repetitions in the bundle except this retransmission, processing is performed still according to the current bundle, that is, an existing deprioritized MAC PDU is transmitted) | new transmission, a new MAC PDU packet is generated | stop CGT (LBT can succeed or fail at this time) |
| | | new transmission, transmission is performed in a manner similar to autoTX. (That is to say, a new transmission is performed, in a case where at least one of the following is satisfied: a MAC PDU is obtained, the previous CG resource is deprioritized, and no corresponding PUSCH is completely transmitted) | stop CGT (LBT can succeed or fail at this time) |
| | | retransmission, retransmission is performed according to NRU autonomous retransmission | not stop CGT (LBT can succeed or fail at this time) |

As shown in Table 2 above, the conditions configured on the network device are:

configuring the LCH-based prioritization;

configuring the CGRT;

not configuring the autonomousTX;

CG resource being a deprioritized resource (e.g., the CG resource is considered as a deprioritized resource due to a conflict). In the above cases, the following implementations may be included (but not limited to these implementations):

A possible implementation is: the currently used CG resource (that is, the first CG resource) performs a new transmission (using a CG resource), and the HARQ process is in the pending state, and for the subsequent CG or CG bundle (that is, the second CG resource, or the second CG bundle), retransmission is performed, and retransmission is performed according to NRU autonomous retransmission (if the CG is a bundle, for other time domain or time-frequency domain positions or repetitions in the bundle except this new transmission, processing is performed still according to the current bundle, that is, an existing deprioritized MAC PDU is transmitted).

Optionally, CGT is stopped at this time, and/or, LBT can succeed or fail at this time.

A possible implementation is: the currently used CG resource (that is, the first CG resource) performs a new transmission (using a CG resource), and the HARQ process is in the pending state, and for the subsequent CG or CG bundle (that is, the second CG resource or the second CG bundle), retransmission is performed, and autonomous retransmission is performed according to the NRU (if the CG is a bundle, for other repetitions in the bundle except this new transmission, processing is performed still according to the current bundle, that is, an existing deprioritized MAC PDU is transmitted).

Optionally, CGT is not stopped at this time, and/or, LBT can succeed or fail at this time.

A possible implementation is: the currently used CG resource (that is, the first CG resource) performs a new transmission (using a CG resource), and the HARQ process is in the not pending state, and for the subsequent CG or CG The bundle (that is, the second CG resource or the second CG bundle), a new transmission is performed, and a new MAC PDU packet is generated (if the CG is a bundle, for other repetitions in the bundle except this new transmission, processing is performed still according to the current bundle, that is, an existing deprioritized MAC PDU is transmitted).

Optionally, CGT is not stopped at this time, and/or, LBT can succeed or fail at this time.

A possible implementation is: the currently used CG resource (that is, the first CG resource) performs a new transmission (using the CG resource), and the HARQ process is in the not pending state, and for the subsequent CG or CG bundle (that is, the second CG resource or the second CG bundle), retransmission is performed, and autonomous retransmission is performed according to the NRU (if the CG is a bundle, for other repetitions in the bundle except this new transmission, processing is performed still according to the current bundle, that is, an existing deprioritized MAC PDU is transmitted).

A possible implementation is: the currently used CG resource (that is, the first CG resource) performs retransmission (using a CG resource and caused by, such as LBT failure, DFI-ACK being not received, etc.; such as retransmission in a bundle; for the current CG resource (such as the deprioritized resource), CGT is already running). And, the HARQ process is in the not pending state (if the CG is a bundle, for repetition for other retransmission, retransmission is processed still according to the current bundle, that is, for other repetitions in the bundle except this retransmission, processing is performed still according to the current bundle, that is, an existing deprioritized MAC PDU is transmitted). For the subsequent CG or CG bundle (that is, the second CG resource or the second CG bundle), retransmission is performed, and autonomous retransmission is performed according to the NRU.

Optionally, CGT is not stopped at this time, and/or, LBT can succeed or fail at this time.

Table 2 shows the transmission mode of the deprioritized resource and the processing of the CG timer for the configuration of the first implementation.

The specific implementations for the second implementation above is as follows:

The specific implementation process is as follows:

The gNB (that is, the network device) allocates CG resources to the UE (that is, the terminal device). While configuring CG resources, the following parameters can be included:

configuring the CGT;
configuring the LCH-based prioritization;
configuring the CGRT; and
configuring the autonomousTX.

In the above cases, the following implementations may be included (but not limited to these implementations):

The UE uses the parameters allocated by the network to determine the transmission mode for CG resource transmission and determine the state of the CG timer. Specifically, when a CG resource is a deprioritized resource (for example, the CG resource is considered as a deprioritized resource due to a conflict, and a valid assembled MAC PDU is generated for the CG at this time), UE performs processing according to the following table:

For example, when a new transmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource, IIoT autonomous transmission or NRU autonomous transmission is performed.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is not stopped (the state remains unchanged). Correspondingly, for a next available CG resource (in the case of CGT timeout), NRU autonomous transmission is performed.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource (in case of CGT timeout), the MAC PDU for the deprioritized CG resource is discarded, and a packet is generated for a new transmission.

For example, when retransmission is performed, if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT corresponding to the CG resource is stopped. Correspondingly, for a next available CG resource (in the case of CGT timeout), retransmission is performed, or autonomous transmission is performed in a manner similar to IIoT autonomous transmission (it is considered that transmission of at least one corresponding PUSCH is completed).

As a possible implementation, the state of the timer in the table can be determined according to the deprioritized CG resource and/or the HARQ process state. The resource transmission mode may be determined according to at least one of: deprioritized CG resource, HARQ process state, and timer state. The resource transmission mode may also be determined in other ways, which are not limited in the embodiments of the present disclosure.

TABLE 3

| conditions: configuring the LCH-based prioritization, configuring the CGRT, configuring the autonomousTX, the CG resource being a deprioritized resource (e.g., the CG resource is considered as a deprioritized resource due to a conflict) | | resource transmission mode (for a subsequent CG, or CG bundle) | CGT state |
|---|---|---|---|
| new transmission (using CG resource) | HARQ process (pending state) | new transmission, a new MAC PDU packet is generated | stop CGT (LBT can succeed or fail at this time) |
| | | new transmission, transmission is performed according to autoTX (that is to say, a new transmission is performed, in a case where at least one of the following is satisfied: a MAC PDU is obtained, the previous | stop CGT (LBT can succeed or fail at this time) |

TABLE 3-continued

| | | | |
|---|---|---|---|
| | | CG resource is deprioritized, and no corresponding PUSCH is completely transmitted) | |
| | | retransmission, retransmission is performed according to NRU autonomous retransmission (if the CG is a bundle, for other repetitions in the bundle except this new transmission, processing is performed still according to the current bundle, that is, an existing deprioritized MAC PDU is transmitted) | stop CGT (LBT can succeed or fail at this time) |
| | | retransmission, retransmission is performed according to NRU autonomous retransmission (if the CG is a bundle, for other repetitions in the bundle except this new transmission, processing is performed still according to the current bundle, that is, an existing deprioritized MAC PDU is transmitted) | not stop CGT LBT can succeed or fail at this time) |
| | HARQ process (not pending state) | new transmission, a new MAC PDU packet is generated (if the CG is a bundle, for other repetitions in the bundle except this new transmission, processing is performed still according to the current bundle, that is, an existing deprioritized MAC PDU is transmitted) | stop CGT (LBT can succeed or fail at this time) |
| | | new transmission, transmission is performed according to autoTX (that is to say, a new transmission is performed, in a case where at least one of the following is satisfied: a MAC PDU is obtained, the previous CG resource is deprioritized, and no corresponding PUSCH is completely transmitted) | stop CGT (LBT can succeed or fail at this time) |
| | | retransmission, retransmission is performed according to NRU autonomous retransmission (if the CG is a bundle, for other repetitions in the bundle except this new transmission, processing is performed still according to the current bundle, that is, an existing deprioritized MAC PDU is transmitted) | not stop CGT (LBT can succeed or fail at this time) |
| retransmission (using CG resource and caused by such as LBT failure, not receiving DFI-ACK, etc.; such as retransmission in a bundle; for the current CG resource (such as the deprioritized resource), CGT is already running) | HARQ process is in not pending state. Note: if the CG is a bundle, for repetitions for other retransmission, retransmission is processed according to the current bundle (that is, for other repetitions in the bundle except this retransmission, processing is performed still according to the current bundle, that is, an existing deprioritized MAC PDU is transmitted) | new transmission, a new MAC PDU packet is generated | stop CGT (LBT can succeed or fail at this time) |
| | | new transmission, transmission is performed in a manner similar to autoTX. (That is to say, a new transmission is performed in a case where at least one of the following is satisfied: a MAC PDU is obtained, the previous CG resource is deprioritized, and no corresponding PUSCH is completely transmitted) | stop CGT (LBT can succeed or fail at this time) |
| | | retransmission, retransmission is performed according to NRU autonomous retransmission | not stop CGT LBT can succeed or fail at this time) |

As shown in Table 3 above, the conditions configured on the network device are:

configuring the LCH-based prioritization;

configuring the CGRT;

configuring the autonomousTX; and the CG resource being a deprioritized resource (e.g., the CG resource is considered as a deprioritized resource due to a conflict).

In above cases, the following implementations may be included (but not limited to these implementations):

A possible implementation is: the currently used CG resource (that is, the first CG resource) performs a new transmission (using a CG resource), and the HARQ process is in the pending state, and for the subsequent CG or CG bundle (that is, the second CG resource, or the second CG bundle), retransmission is performed, and retransmission is performed according to NRU autonomous retransmission (if CG is a bundle, for other time domain or time-frequency domain positions or repetitions in the bundle except this new transmission, processing is performed still according to the current bundle, that is, an existing deprioritized MAC PDU is transmitted).

Optionally, CGT is stopped at this time, and/or, LBT can succeed or fail at this time.

A possible implementation is: the currently used CG resource (that is, the first CG resource) performs a new transmission (using a CG resource), and the HARQ process is in the not pending state, and for the subsequent CG or CG bundle (that is, the second CG resource, or the second CG bundle), a new transmission is performed, and transmission is performed according to autoTX (that is to say, a new transmission is performed, in a case where at least one of the following is satisfied: a MAC PDU is obtained, the previous CG resource is deprioritized, and no corresponding PUSCH is completely transmitted).

Optionally, CGT is stopped at this time, and/or, LBT can succeed or fail at this time.

A possible implementation is: the currently used CG resource (that is, the first CG resource) performs retransmission (using a CG resource and caused by such as LBT failure, DFI-ACK being not received, etc.; such as retransmission in a bundle; for current CG resource (such as the deprioritized resource), CGT is already running). And, the HARQ process is in the not pending state (if the CG is a bundle, for repetitions for other retransmissions, retransmission processing is performed according to the current bundle, that is, for other repetitions in the bundle except this retransmission, processing is performed according to the current bundle, that is, an existing deprioritized MAC PDU is transmitted). For a subsequent CG or CG bundle (that is, the second CG resource, or the second CG bundle), retransmission is performed, and retransmission is performed according to the NRU autonomous retransmission.

Optionally, CGT is not stopped at this time, and/or, LBT can succeed or fail at this time.

The above Table 3 shows transmission mode for the deprioritized resource and processing of the CG timer for the configuration of the second Implementation.

Third Implementation:

The first configuration is used to indicate:

configuring the CGT;

configuring the LCH-based prioritization;

not configuring the CGRT; and not configuring the autonomous transmission mechanism.

With regard to the third implementation above, the implementations of determining the CG resource transmission mode, and/or determining the CG timer (CGT) state can be as follows:

In an optional implementation: determining the CGT state according to the first configuration information if the first CG resource is the deprioritized resource includes but is not limited to any one of the following:

(1.1) If the first CG resource is the deprioritized resource, the CGT is stopped.

(2.1) If the first CG resource is the deprioritized resource, the CGT is not stopped.

(3.1) The first CG resource belongs to the first CG resource group, and if the first CG resource is the deprioritized resource, the CGT is stopped.

(4.1) The first CG resource belongs to the first CG resource group, and if the first CG resource is the deprioritized resource, the CGT is not be stopped.

(5.1) If the first CG resource is the deprioritized resource and a first condition is satisfied, the CGT is stopped. The first condition includes but is not limited to at least one of the following that: a MAC PDU is obtained, there is at least one corresponding PUSCH that is not completely transmitted, and there is no corresponding PUSCH that is completely transmitted.

(6.1) If the first CG resource is the deprioritized resource and the first condition is satisfied, the CGT is not stopped.

In an optional implementation: determining the CG resource transmission mode according to the first configuration information if the first Cg resource is the deprioritized resource includes but is not limited to any one of the following:

(A.1) If the first CG resource is the deprioritized resource, for the first CG resource, a new MAC PDU packet is generated, and a new transmission of the new MAC PDU packet is performed through the second CG resource.

The time domain position of the second CG resource is after the first CG resource, and the second CG resource is associated with the same first HARQ process as the first CG resource; or, the time domain position of the second CG resource involved is after the first CG resource, and the data/MAC PDU of the first HARQ process associated with the first CG resource may be transmitted through the second CG resource or the second HARQ process corresponding to the second resource.

(B.1) The first CG resource belongs to the first CG resource group, and if the first CG resource is the deprioritized resource, then for the first CG resource, a new MAC PDU packet is generated, and a new transmission of the new MAC PDU packet is performed through the second CG resource.

(C.1) The first CG resource belongs to the first CG resource group, and if the first CG resource is the deprioritized resource, then for the first CG resource, a new MAC PDU packet is generated, a new transmission of the new MAC PDU packet is performed through the second CG resource, and an existing deprioritized MAC PDU is retransmitted through other CG resource; the other CG resource is a CG resource other than the first CG resource in the first CG resource group.

(D.1) If the first CG resource is the deprioritized resource and a first condition is satisfied, a new transmission is performed through the second CG resource. The first condition includes but is not limited to at least one of the following that: a MAC PDU is obtained, there is at least one corresponding PUSCH that is not completely transmitted, and there is no corresponding PUSCH that is completely transmitted.

(E.1) If the first CG resource is the deprioritized resource and the first condition is satisfied, a new transmission is performed through the second CG resource. The new transmission is IIoT/URLLC autonomous transmission.

(F.1) If the first CG resource is the deprioritized resource, NRU autonomous retransmission is performed through the second CG resource.

(G.1) The first CG resource belongs to the first CG resource group, and if the first CG resource is the deprioritized resource, then for the first CG resource, NRU autonomous retransmission is performed through the second CG resource.

(H.1) The first CG resource belongs to the first CG resource group, and if the first CG resource is the deprioritized resource, then for the first CG resource, NRU autonomous retransmission is performed through the second CG resource, and an existing deprioritized MAC PDU is retransmitted through other CG resource.

In another optional implementation: determining the CG resource transmission mode according to the first configuration information if the first CG resource is the deprioritized resource includes but is not limited to any one of the following:

1.1) If the first CG resource is the deprioritized resource and CGT is stopped, for the first CG resource, a new MAC PDU packet is generated, and a new transmission of the new MAC PDU packet is performed through the second CG resource. The time domain position of the second CG resource is after the first CG resource, and the second CG resource is associated with the same first HARQ process as the first CG resource.

2.1) If the first CG resource is the deprioritized resource and CGT is not stopped, for the first CG resource, a new MAC PDU packet is generated, and a new transmission is performed through the second CG resource.

3.1) The first CG resource belongs to the first CG resource group, and if the first CG resource is the deprioritized resource and CGT is stopped, for the first CG resource, a new MAC PDU packet is generated, and a new transmission of the new MAC PDU packet is performed through the second CG resource.

4.1) The first CG resource belongs to the first CG resource group, and if the first CG resource is the deprioritized resource and the CGT is stopped, then for the first CG resource, a new MAC PDU packet is generated, and a new transmission of the new MAC PDU packet is performed through the second CG resource, and an existing deprioritized MAC PDU is retransmitted through other CG resource; the other CG resource is a CG resource other than the first CG resource in the first CG resource group.

5.1) The first CG resource belongs to the first CG resource group, and if the first CG resource is the deprioritized resource and the CGT is not stopped, then for the first CG resource, a new MAC PDU packet is generated, and a new transmission of the new MAC PDU packet is performed through the second CG resource.

6.1) The first CG resource belongs to the first CG resource group, and if the first CG resource is the deprioritized resource and the CGT is not stopped, then for the first CG resource, a new MAC PDU packet is generated, and a new transmission of the new MAC PDU packet is performed through the second CG resource, and an existing deprioritized MAC PDU is retransmitted through other CG resource.

7.1) If the first CG resource is a deprioritized resource, the first condition is satisfied and the CGT is stopped, a new transmission is performed through the second CG resource. The first condition includes but is not limited to at least one of the following that: a MAC PDU is obtained, there is at least one corresponding PUSCH that is not completely transmitted, and there is no corresponding PUSCH that is completely transmitted.

8.1) If the first CG resource is the deprioritized resource, the first condition is satisfied and the CGT is stopped, a new transmission is performed through the second CG resource; the new transmission is IIoT/URLLC autonomous transmission.

9.1) If the first CG resource is the deprioritized resource, the first condition is satisfied and the CGT is not stopped, a new transmission is performed through the second CG resource.

10.1) If the first CG resource is the deprioritized resource, the first condition is satisfied, and CGT is not stopped, a new transmission is performed through the second CG resource; the new transmission is IIoT/URLLC autonomous transmission.

11.1) If the first CG resource is the deprioritized resource and the CGT is stopped, NRU autonomous retransmission is performed through the second CG resource.

12.1) If the first CG resource is the deprioritized resource and the CGT is not stopped, NRU autonomous retransmission is performed through the second CG resource.

13.1) If the first CG resource belongs to the first CG resource group, if the first CG resource is the deprioritized resource and the CGT is stopped, for the first CG resource, NRU autonomous retransmission is performed through the second CG resource.

14.1) If the first CG resource belongs to the first CG resource group, if the first CG resource is the deprioritized resource and CGT is stopped, then for the first CG resource, NRU autonomous retransmission is performed through the second CG resource, and an existing deprioritized MAC PDU is retransmitted through other CG resource.

15.1) If the first CG resource belongs to the first CG resource group, if the first CG resource is the deprioritized resource and the CGT is not stopped, then for the first CG resource, NRU autonomous retransmission is performed through the second CG resource.

16.1) If the first CG resource belongs to the first CG resource group, if the first CG resource is the deprioritized resource and CGT is not stopped, then for the first CG resource, NRU autonomous retransmission is performed through the second CG resource, and an existing deprioritized MAC PDU is retransmitted through other CG resource.

Optionally, any one of the above (1.1) to (6.1), any one of the above (A.1) to (H.1), or any one of the above 1.1) to 16.1), may be determined in a case where a new transmission is performed through the first CG resource.

Optionally, any one of the above (1.1) to (6.1), any one of the above (A.1) to (H.1), or any one of the above 1.1) to 16.1), may be determined in a case where retransmission is performed through the first CG resource.

The specific implementation process for the third implementation above is as follows:

The specific implementation process is as follows:

The gNB (network device) allocates CG resources to the UE (terminal device). While configuring CG resources, the following parameters can be included:

configuring the CGT;

configuring the LCH-based prioritization;

not configuring the CGRT;

not configuring the autonomousTX.

In the above cases, the following implementations may be included (but is not limited to these implementations):

When a CG resource is a deprioritized resource (for example, the CG resource is considered as a deprioritized resource due to a conflict, and a valid assembled MAC PCU is generated for the CG at this time), UE performs processing according to the following table:

For example, in a new transmission or retransmission (such as bundle, such as dynamic scheduling (dynamic grant, DG) is performed to perform CG retransmission), if there is a CG resource which is deprioritized due to LCH- CG resource, the MAC PDU for the deprioritized CG resource is discarded, and a packet is generated for a new transmission.

For example, in a new transmission or retransmission (such as bundle, such as CG resource retransmission by DG), if there is a CG resource which is deprioritized due to LCH-based prioritization, or if there is a CG resource which is deprioritized due to CI-RNTI, or if there is a CG resource which is deprioritized due to a conflict with a high-priority PUCCH resource, the CGT state corresponding to the CG resource remains unchanged. Correspondingly, for a next available CG resource (in the case of CGT timeout), the MAC PDU for the deprioritized CG resource is discarded, and a packet is generated for a new transmission.

As a possible implementation, the state of the timer in the table can be determined according to the deprioritized CG resource and/or the HARQ process state. The resource transmission mode may be determined according to at least one of: deprioritized CG resources, HARQ process state, and timer state. The resource transmission mode may also be determined in other ways, which are not limited in the embodiments of the present disclosure.

TABLE 4

| conditions: configuring the LCH-based prioritization, not configuring CGRT, configuring CGT, not configuring autonomousTX, the CG resource being a deprioritized resource (e.g., the CG resource is considered as a deprioritized resource due to a conflict) | resource transmission mode (for a subsequent CG resource, or CG bundle) | timer state |
|---|---|---|
| new transmission (using CG resource) | new transmission, a new MAC PDU packet is generated (but for other repetitions in a bundle except this new transmission, processing is performed still according to the current bundle, that is, an existing deprioritized MAC PDU is transmitted) | stop CGT or not stop CGT |
| | new transmission, transmission is performed in a manner similar to autoTX. (That is to say, a new transmission is performed in a case where at least one of the following is satisfied: a MAC PDU is obtained, the previous CG resource is deprioritized, and no corresponding PUSCH is completely transmitted) | stop CGT or not stop CGT |
| retransmission (such as bundle) | new transmission, a new MAC PDU packet is generated | stop CGT or not stop CGT |
| | new transmission, and transmission is performed in a manner similar to autoTX. (That is to say, a new transmission is performed in a case where at least one of the following is satisfied: a MAC PDU is obtained, the previous CG resource is deprioritized, and no corresponding PUSCH is completely transmitted) | stop CGT or not stop |
| | existing bundle retransmission processing (that is, for other repetitions in the bundle except this retransmission, processing is performed still according to the current bundle, that is, an existing deprioritized MAC PDU is transmitted) | stop CGT or not stop CGT | based prioritization, or if there is a CG resource which is deprioritized due to CI-RNTI, or if there is a CG resource which is deprioritized due to a conflict with a high-priority PUCCH resource, the CGT corresponding to the CG resources is stopped. Correspondingly, for a next available As shown in Table 2 above, the conditions configured on the network device are:

Configuring the LCH-based prioritization;

not configuring the CGRT, configuring the CGT;

not configuring the autonomousTX;

the CG resource being the deprioritized resource (e.g., the CG resource is considered as a deprioritized resource due to a conflict).

In the above cases, the following implementations may be included (but is not limited to these implemented):

In an optional implementation: the currently used CG resource (that is, the first CG resource) performs a new transmission (using a CG resource), and for a subsequent CG or CG bundle (that is, the second CG resource, or the second CG bundle), a new transmission is performed, and a new MAC PDU packet is generated (but for other repetitions in the bundle except this new transmission, processing is performed still according to the current bundle, that is, an existing deprioritized MAC PDU is transmitted).

Optionally, at this time, the HARQ process may be in a not pending state or a pending state.

Optionally, the CGT may or may not be stopped at this time.

In another optional implementation: the currently used CG resource (that is, the first CG resource) performs retransmission (using a CG resource), and for a subsequent CG or CG bundle (that is, the second CG resource, or the second CG bundle), retransmission is processed according to the current bundle (that is, for other repetitions in the bundle except this retransmission, processing is performed according to the current bundle, that is, an existing deprioritized MAC PDU is transmitted).

The above Table 4 shows the transmission mode for the deprioritized resource and the processing of the CG timer for the configuration of the third implementation.

In the embodiments of the present disclosure, the terminal device may receive the first configuration information sent by the network device, and according to the first configuration information, determine the CG resource transmission mode, and/or determine the state of the CG timer. The first configuration information is used to indicate at least one of the following: configuring at least one CG resource; configuring the CG timer (CGT); configuring the LCH-based prioritization, or not configuring the LCH-based prioritization; configuring the CG retransmission timer (CGRT), or not configuring the CGRT; configuring the autonomous transmission mechanism, or not configuring the autonomous transmission mechanism. In this way, the terminal device can determine the transmission mode for the CG resource and/or the state of the CG timer for different CG resource-related configurations indicated by the network device.

Figures 3, 4:
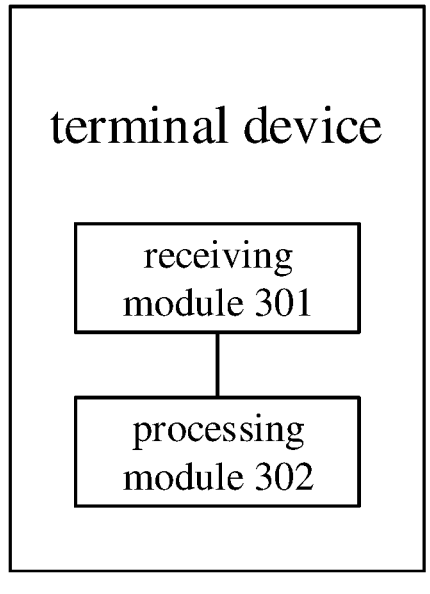
FIG. 3 is a schematic structural diagram of a terminal device provided by an embodiment of the present disclosure.
FIG. 4 is a schematic structural diagram of a network device provided by an embodiment of the present disclosure.

As shown in FIG. 3, there is provided a terminal device. The terminal device includes a receiving module 301 and a processing module 302.

The receiving module 301 is configured to receive first configuration information sent by a network device.

The processing module 302 is configured to, according to the first configuration information, determine a Configured Grant (CG) resource transmission mode, and/or, determine a CG Timer (CGT) state.

Optionally, the first configuration information is used to indicate at least one of:

configuring at least one CG resource;
configuring a CGT;
configuring Logical Channel (LCH)-based prioritization, or not configuring the LCH-based prioritization;
configuring a CG retransmission timer (CGRT), or not configuring the CGRT; or
configuring an autonomous transmission mechanism, or not configuring the autonomous transmission mechanism.

Optionally, the processing module 302 is configured to:

in response to that a first CG resource is a deprioritized resource, according to the first configuration information, determine the CG resource transmission mode, and/or determine the CGT state;

wherein the first CG resource is one CG resource in the at least one CG resource.

Optionally, the first configuration information is used to indicate:

configuring the CGT;
configuring the LCH-based prioritization;
configuring the CGRT; and
not configuring the autonomous transmission mechanism.

Optionally, the first configuration information is used to indicate:

configuring the CGT;
configuring the LCH-based prioritization;
configuring the CGRT; and
configuring the autonomous transmission mechanism.

Optionally, the processing module 302 is configured to:

in response to that the first CG resource is the deprioritized resource, stop the CGT;

or, the first CG resource belonging to a first CG resource group, and in response to that the first CG resource is the deprioritized resource, stop the CGT;

or, in response to that the first CG resource is the deprioritized resource and a first condition is satisfied, stop the CGT, wherein the first condition includes at least one of the following that:

a MAC PDU is obtained, there is at least one corresponding PUSCH that is not completely transmitted, and there is no corresponding PUSCH that is completely transmitted;

or, in response to that the first CG resource is the deprioritized resource, not stop the CGT;

or, in response to that the first CG resource is the deprioritized resource and the first CG resource belongs to the first CG resource group, not stop the CGT.

Optionally, the processing module 302 is configured to:

in response to that the first CG resource is the deprioritized resource, generate a new Medium Access Control (MAC) Protocol Data Unit (PDU) packet, and perform a new transmission of the new MAC PDU packet through a second CG resource, wherein a time domain position of the second CG resource is after the first CG resource, and the second CG resource is associated with a same first Hybrid Automatic Repeat Request (HARQ) process as the first CG resource;

or, the first CG resource belonging to a first CG resource group, and in response to that the first CG resource is the deprioritized resource, generate a MAC PDU packet, and perform a new transmission of the new MAC PDU packet through the second CG resource;

or, the first CG resource belonging to the first CG resource group, and in response to that the first CG resource is the deprioritized resource, generate a new MAC PDU packet, and perform a new transmission of the new MAC PDU packet through the second CG resource, and retransmit an existing deprioritized MAC PDU through other CG resource, wherein the other CG resource is a resource other than the first CG resource in the first CG resource group;

or, in response to that the first CG resource is the deprioritized resource and a first condition is satisfied, perform a new transmission through the second CG resource, wherein the first condition includes at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, perform a new transmission through the second CG resource, wherein the new transmission is Industrial Internet of Things (IIoT)/Ultra-reliable and Low Latency Communications (URLLC) autonomous transmission;

or, in response to that the first CG resource is the deprioritized resource, perform New Radio Unlicensed (NRU) autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, the processing module 302 is configured to:

in response to that the first CG resource is the deprioritized resource and the CGT is stopped, generate a new MAC PDU packet for the first CG resource, and perform a new transmission of the new MAC PDU packet through a second CG resource, wherein a time domain position of the second CG resource is after the first CG resource, and the second CG resource is associated with a same first HARQ process as the first CG resource;

or, the first CG resource belonging to a first CG resource group, and in response to that the first CG resource is the deprioritized resource and the CGT is stopped, generate a new MAC PDU packet, and perform a new transmission of the new MAC PDU packet through the second CG resource;

or, the first CG resource belonging to the first CG resource group, and in response to that the first CG resource is the deprioritized resource and the CGT is stopped, generate a new MAC PDU packet, and perform a new transmission of the new MAC PDU packet through the second CG resource, and retransmit an existing deprioritized MAC PDU through other CG resource, wherein the other CG resource is a resource other than the first CG resource in the first CG resource group;

or, in response to that the first CG resource is the deprioritized resource and a first condition is satisfied and the CGT is stopped, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied and the CGT is stopped, perform a new transmission through the second CG resource, wherein the new transmission is IIoT/URLLC autonomous transmission;

or, in response to that the first CG resource is the deprioritized resource and the CGT is stopped, perform NRU autonomous retransmission through the second CG resource;

or, in response to that the first CG resource is the deprioritized resource and the CGT is not stopped, perform NRU autonomous retransmission through the second CG resource;

or, the first CG resource belonging to the first CG resource group, and in response to that the first CG resource is the deprioritized resource and the CGT is stopped, for the first CG resource, perform NRU autonomous retransmission through the second CG resource;

or, the first CG resource belonging to the first CG resource group, and in response to that the first CG resource is the deprioritized resource and the CGT is stopped, for the first CG resource, perform NRU autonomous retransmission through the second CG resource, and retransmit an existing deprioritized MAC PDU through the other CG resource;

or, the first CG resource belonging to the first CG resource group, and in response to that the first CG resource is the deprioritized resource and the CGT is not stopped, for the first CG resource, perform NRU autonomous retransmission through the second CG resource;

or, the first CG resource belonging to the first CG resource group, and in response to that the first CG resource is the deprioritized resource and the CGT is not stopped, for the first CG resource, perform NRU autonomous retransmission through the second CG resource, and retransmit an existing deprioritized MAC PDU through the other CG resource.

Optionally, a new transmission is performed through the first CG resource.

Optionally, in response to that the first HARQ process is in a pending state, the processing module 302 is configured to:

in response to that the first CG resource is the deprioritized resource, generate the new MAC PDU packet and perform a new transmission of the new MAC PDU packet through the second CG resource;

or, in response to that the first CG resource is the deprioritized resource and a first condition is satisfied, perform a new transmission through the second CG resource, wherein first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, in response to that the first HARQ process is in a not pending state, the processing module 302 is configured to:

in response to that the first CG resource is the deprioritized resource, generate the new MAC PDU packet and perform a new transmission of the new MAC PDU packet through the second CG resource;

or, the first CG resource belonging to the first CG resource group, and in response to that the first CG resource is the deprioritized resource, generate the new MAC PDU packet, and perform a new transmission of the new MAC PDU packet through the second CG resource;

or the first CG resource belonging to the first CG resource group, and in response to that the first CG resource is the deprioritized resource, generate the new MAC PDU packet, and perform a new transmission of the new MAC PDU packet through the second CG resource, and retransmit an existing deprioritized MAC PDU through other CG resource;

or, in response to that the first CG resource is the deprioritized resource and the first condition is satisfied, perform a new transmission through the second CG resource;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through the other CG resource.

Optionally, retransmission is performed through the first CG resource;

wherein the processing module 302 is configured to:

in response to that the first CG resource is the deprioritized resource, generate the new MAC PDU packet, and perform a new transmission of the new MAC PDU packet through the second CG resource;

or, in response to that the first CG resource is the deprioritized resource and the first condition is satisfied, perform a new transmission through the second CG resource;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, the first configuration is used to indicate:

configuring the CGT;

configuring the LCH-based prioritization;

not configuring the CGRT; and not configuring the autonomous transmission mechanism.

Optionally, the processing module 302 is configured to:
in response to that the first CG resource is the deprioritized resource, stop the CGT;
or,
in response to that the first CG resource is the deprioritized resource, not stop the CGT;
or,
the first CG resource belonging to a first CG resource group, and in response to that the first CG resource is the deprioritized resource, stop the CGT;
or,
the first CG resource belonging to the first CG resource group, and in response to that the first CG resource is the deprioritized resource, not stop the CGT;
or,
in response to that the first CG resource is the deprioritized resource and a first condition is satisfied, stop the CGT, wherein the first condition includes but is not limited to at least one of the following that:
a MAC PDU is obtained,
there is at least one corresponding PUSCH that is not completely transmitted, and
there is no corresponding PUSCH that is completely transmitted;
or,
in response to that the first CG resource is the deprioritized resource and the first condition is satisfied, not stop the CGT.
Optionally, the processing module 302 is configured to:
in response to that the first CG resource is the deprioritized resource, for the first CG resource, generate a new MAC PDU packet, and perform a new transmission of the new MAC PDU packet through a second CG resource, wherein a time domain position of the second CG resource is after the first CG resource, and the second CG resource is associated with a same first HARQ process as the first CG resource;
or,
the first CG resource belonging to the first CG resource group, and in response to that the first CG resource is the deprioritized resource, for the first CG resource, generate a new MAC PDU packet, and perform a new transmission of new MAC PDU packet through the second CG resource;
or,
the first CG resource belonging to the first CG resource group, and in response to that the first CG resource is the deprioritized resource, for the first CG resource, generate a new MAC PDU packet, and perform a new transmission of the new MAC PDU packet through the second CG resource, and retransmit an existing deprioritized MAC PDU through other CG resource, wherein the other CG resource is a CG resource other than the first CG resource in the first CG resource group;
or,
in response to that the first CG resource is the deprioritized resource and a first condition is satisfied, perform a new transmission through the second CG resource, wherein the first condition includes but is not limited to at least one of the following that:
a MAC PDU is obtained,
there is at least one corresponding PUSCH that is not completely transmitted, and there is no corresponding PUSCH that is completely transmitted;
or,
in response to that the first CG resource is the deprioritized resource and the first condition is satisfied, perform a new transmission through the second CG resource, wherein the new transmission is IIoT/URLLC autonomous transmission;
or,
in response to that the first CG resource is the deprioritized resource, perform NRU autonomous retransmission through the second CG resource;
or,
the first CG resource belonging to the first CG resource group, and in response to that the first CG resource is the deprioritized resource, for the first CG resource, perform NRU autonomous retransmission through the second CG resource;
or,
the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.
Optionally, the processing module 302 is configured to:
in response to that the first CG resource is the deprioritized resource and the CGT is stopped, for the first CG resource, generate a new MAC PDU packet, and perform a new transmission of the new MAC PDU packet through a second CG resource, wherein a time domain position of the second CG resource is after the first CG resource, and the second CG resource is associated with a same first HARQ process as the first CG resource;
or,
in response to that the first CG resource is the deprioritized resource and the CGT is not stopped, for the first CG resource, generate a new MAC PDU packet and perform a new transmission through the second CG resource;
or,
the first CG resource belonging to the first CG resource group, and in response to that the first CG resource is the deprioritized resource and the CGT is stopped, for the first CG resource, generate a new MAC PDU packet, and perform a new transmission of the new MAC PDU packet through the second CG resource;
or,
the first CG resource belonging to the first CG resource group, and in response to that the first CG resource is the deprioritized resource and the CGT is stopped, for the first CG resource, generate a new MAC PDU packet, perform a new transmission of the new MAC PDU packet through the second CG resource, and retransmit an existing deprioritized MAC PDU through other CG resource, wherein the other CG resource is a CG resource other than the first CG resource in the first CG resource group;
or,
the first CG resource belonging to the first CG resource group, and in response to that the first CG resource is the deprioritized resource and the CGT is not stopped, for the first CG resource, generate a new MAC PDU packet, and perform a new transmission of the new MAC PDU packet through the second CG resource;
or,
the first CG resource belonging to the first CG resource group, and in response to that the first CG resource is the deprioritized resource and the CGT is not stopped, for the first CG resource, generate a new MAC PDU packet, perform a new transmission of the new MAC PDU packet through the second CG resource, and retransmit an existing deprioritized MAC PDU through the other CG resource;

or, in response to that the first CG resource is the deprioritized resource, a first condition is satisfied, and the CGT is stopped, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource, the first condition is satisfied, and the CGT is stopped, perform a new transmission through the second CG resource, wherein the new transmission is IIoT/URLLC autonomous transmission;

or, in response to that the first CG resource is the deprioritized resource, the first condition is satisfied, and the CGT is not stopped, perform a new transmission through the second CG resource;

or, in response to that the first CG resource is the deprioritized resource, the first condition is satisfied, and the CGT is not stopped, perform a new transmission through the second CG resource, wherein the new transmission is IIoT/URLLC autonomous transmission;

or, in response to that the first CG resource is the deprioritized resource and the CGT is stopped, perform NRU autonomous retransmission through the second CG resource;

or, in response to that the first CG resource is the deprioritized resource and the CGT is not stopped, perform NRU autonomous retransmission through the second CG resource;

or, in response to that the first CG resource belonging to the first CG resource group, in response to that the first CG resource is the deprioritized resource and the CGT is stopped, for the first CG resource, perform NRU autonomous retransmission through the second CG resource;

or, in response to that the first CG resource belonging to the first CG resource group, in response to that the first CG resource is the deprioritized resource and the CGT is stopped, for the first CG resource, perform NRU autonomous retransmission through the second CG resource, and retransmit an existing deprioritized MAC PDU through the other CG resource;

or, in response to that the first CG resource belonging to the first CG resource group, in response to that the first CG resource is the deprioritized resource and the CGT is not stopped, for the first CG resource, perform NRU autonomous retransmission through the second CG resource;

or, in response to that the first CG resource belonging to the first CG resource group, in response to that the first CG resource is the deprioritized resource and the CGT is not stopped, for the first CG resource, perform NRU autonomous retransmission through the second CG resource, and retransmit an existing deprioritized MAC PDU through the other CG resource.

Optionally, a new transmission is performed through the first CG resource, or a retransmission is performed through the first CG resource.

Optionally, the first CG resource being the deprioritized resource, includes:

the first CG resource being determined to be a deprioritized CG resource due to LCH-based prioritization;

or, the first CG resource being determined to be a deprioritized CG resource due to a cancellation indication Radio Network Temporary Identifier (CI-RNTI) value;

or, the first CG resource being determined to be a deprioritized CG resource due to a conflict between the first CG resource and a high-priority Physical Uplink Control Channel (PUCCH) resource;

or, the first CG resource being determined to be a deprioritized CG resource due to a conflict between the first CG resource and a high-priority PUSCH;

or, the first CG resource being determined to be a deprioritized CG resource due to a priority indication from a physical layer.

As shown in FIG. 4, an embodiment of the present disclosure provides a network device. The network device includes a sending module 401.

The sending module 401 is configured to send first configuration information to a terminal device, wherein the first configuration information is used for a Configured Grant (CG) resource transmission mode and/or a CG Timer (CGT) state.

Optionally, the first configuration information is used to indicate at least one of the following:

configuring at least one CG resource;

configuring a CGT;

configuring Logical Channel (LCH)-based prioritization, or not configuring the LCH-based prioritization;

configuring a CG retransmission timer (CGRT), or not configuring the CGRT; or configuring an autonomous transmission mechanism, or not configuring the autonomous transmission mechanism.

Optionally, the first configuration information is used to determine the CG resource transmission mode and/or the CGT state when the first CG resource is a deprioritized resource;

wherein the first CG resource is one CG resource in the at least one CG resource.

Optionally, the first configuration information is used to indicate:

configuring the CGT;

configuring the LCH-based prioritization;

configuring the CGRT; and not configuring the autonomous transmission mechanism.

Optionally, the first configuration information is used to indicate:

configuring the CGT;

configuring the LCH-based prioritization;

configuring the CGRT; and configuring the autonomous transmission mechanism.

Optionally, the first configuration information is used to indicate:

configuring the CGT;

configuring the LCH-based prioritization;

not configuring the CGRT; and not configuring the autonomous transmission mechanism.

Optionally, the first CG resource being the deprioritized resource, includes:

the first CG resource being determined to be a deprioritized CG resource due to LCH-based prioritization; or, the first CG resource being determined to be a deprioritized CG resource due to a cancellation indication Radio Network Temporary Identifier (CI-RNTI) value; or, the first CG resource being determined to be a deprioritized CG resource due to a conflict between the first CG resource and a high-priority Physical Uplink Control Channel (PUCCH) resource; or, the first CG resource being determined to be a deprioritized CG resource due to a conflict between the first CG resource and a high-priority PUSCH; or, the first CG resource being determined to be a deprioritized CG resource due to a priority indication from a physical layer.

An embodiment of the present disclosure also provides a terminal device, including: a memory storing executable program codes; and a processor coupled to the memory.

The processor invokes the executable program codes stored in the memory to perform the methods performed by the terminal device in the embodiments of the present disclosure.

An embodiment of the present disclosure also provides a network device, including: a memory storing executable program codes; and a processor coupled to the memory.

The processor invokes the executable program codes stored in the memory to perform the methods performed by the network device in the embodiments of the present disclosure.

Figure 5:
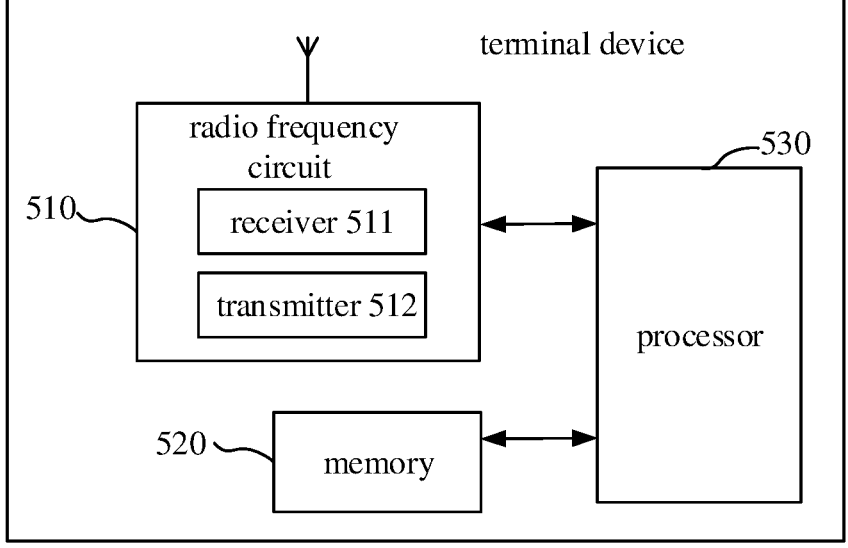
FIG. 5 is a schematic diagram of a hardware structure of a terminal device provided by an embodiment of the present disclosure.

Exemplarily, FIG. 5 is a schematic diagram of a hardware structure of a terminal device. The terminal device includes: a radio frequency (RF) circuit 510, a memory 520, a processor 530 and other components. The radio frequency circuit 510 includes a receiver 511 and a transmitter 512. Those skilled in the art can understand that the structure of the terminal device shown in FIG. 5 does not constitute a limitation on the terminal device, and the structure may include more or less components than those shown in the figure, or some components may be combined, or the components may be arranged in a different way.

The RF circuit 510 may be used for sending and receiving information or sending and receiving signals during a call. In particular, after receiving downlink information from a base station, the processor 530 processes it. In addition, the RF circuit 510 sends an involved uplink data to the base station. Generally, the RF circuit 510 includes, but is not limited to, an antenna, at least one amplifier, a transceiver, a coupler, a low noise amplifier (LNA), a duplexer, and the like. In addition, RF circuit 510 may also communicate with networks and other devices via wireless communications. The above wireless communication can use any communication standard or protocol, including but not limited to: Global System of Mobile communication (GSM), General Packet Radio Service, GPRS), Code Division Multiple Access (CDMA), Wideband Code Division Multiple Access (WCDMA), Long Term Evolution (LTE), e-mail, short messaging service (SMS), etc.

The memory 520 may be used to store software programs and modules, and the processor 530 executes various functional applications and data processing of the terminal device by running the software programs and modules stored in the memory 520. The memory 520 may mainly include a program storage area and a data storage area. The program storage area may store an operating system, at least one application program required by a function (such as a sound playback function, an image playback function, etc.). The data storage area may store data created by the use of terminal device (such as audio data, phonebook, etc.). In addition, the memory 520 may include a high-speed random access memory, and may also include a non-volatile memory, such as at least one magnetic disk storage device, flash memory device, or other volatile solid-state storage devices.

The processor 530 is the control center, connects various parts of the entire terminal device with various interfaces and lines, runs or executes software programs and/or modules stored in the memory 520, and invokes data stored in the memory 520 to realize various functions and process data of the terminal device, so as to monitor the terminal device as a whole. Optionally, the processor 530 may include one or more processing units; for example, the processor 530 may integrate an application processor and a modem processor. The application processor mainly processes an operating system, user interface, and application programs, etc. The modem processor mainly handles wireless communications. It can be understood that the foregoing modem processor may not be integrated into the processor 530.

In an embodiment of the present disclosure, the RF circuit 510 is configured to receive the first configuration information sent by the network device.

The processor 530 is configured to, according to the first configuration information, determine a CG resource transmission mode, and/or, determine a CG Timer (CGT) state.

Optionally, the first configuration information is used to indicate at least one of:

configuring at least one CG resource;

configuring a CGT;

configuring Logical Channel (LCH)-based prioritization, or not configuring the LCH-based prioritization;

configuring a CG retransmission timer (CGRT), or not configuring the CGRT; or configuring an autonomous transmission mechanism, or not configuring the autonomous transmission mechanism.

Optionally, the processor 530 is configured to:

in response to that a first CG resource is a deprioritized resource, according to the first configuration information, determine the CG resource transmission mode, and/or determine the CGT state;

wherein the first CG resource is one CG resource in the at least one CG resource.

Optionally, the first configuration information is used to indicate:

configuring the CGT;

configuring the LCH-based prioritization;

configuring the CGRT; and not configuring the autonomous transmission mechanism.

Optionally, the first configuration information is used to indicate:

configuring the CGT;

configuring the LCH-based prioritization;

configuring the CGRT; and configuring the autonomous transmission mechanism.

Optionally, the processor 530 is configured to:

in response to that the first CG resource is the deprioritized resource, stop the CGT;

or, the first CG resource belonging to a first CG resource group, and in response to that the first CG resource is the deprioritized resource, stop the CGT;

or, in response to that the first CG resource is the deprioritized resource and a first condition is satisfied, stop the CGT, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource, not stop the CGT;

or, in response to that the first CG resource is the deprioritized resource and the first CG resource belongs to the first CG resource group, not stop the CGT.

Optionally, the processor 530 is configured to:

in response to that the first CG resource is the deprioritized resource, generate a new Medium Access Control (MAC) Protocol Data Unit (PDU) packet, and perform a new transmission of the new MAC PDU packet through a second CG resource, wherein a time domain position of the second CG resource is after the first CG resource, and the second CG resource is associated with a same first Hybrid Automatic Repeat Request (HARQ) process as the first CG resource;

or, the first CG resource belonging to a first CG resource group, and in response to that the first CG resource is the deprioritized resource, generate a MAC PDU packet, and perform a new transmission of the new MAC PDU packet through the second CG resource;

or, the first CG resource belonging to the first CG resource group, and in response to that the first CG resource is the deprioritized resource, generate a new MAC PDU packet, and perform a new transmission of the new MAC PDU packet through the second CG resource, and retransmit an existing deprioritized MAC PDU through other CG resource, wherein the other CG resource is a resource other than the first CG resource in the first CG resource group;

or, in response to that the first CG resource is the deprioritized resource and a first condition is satisfied, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, perform a new transmission through the second CG resource, wherein the new transmission is Industrial Internet of Things (IIoT)/Ultra-reliable and Low Latency Communications (URLLC) autonomous transmission;

or, in response to that the first CG resource is the deprioritized resource, perform New Radio Unlicensed (NRU) autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, the processor 530 is configured to:

in response to that the first CG resource is the deprioritized resource and the CGT is stopped, generate a new MAC PDU packet for the first CG resource, and perform a new transmission of the new MAC PDU packet through a second CG resource, wherein a time domain position of the second CG resource is after the first CG resource, and the second CG resource is associated with a same first HARQ process as the first CG resource;

or, the first CG resource belonging to a first CG resource group, and in response to that the first CG resource is the deprioritized resource and the CGT is stopped, generate a new MAC PDU packet, and perform a new transmission of the new MAC PDU packet through the second CG resource;

or, the first CG resource belonging to the first CG resource group, and in response to that the first CG resource is the deprioritized resource and the CGT is stopped, generate a new MAC PDU packet, and perform a new transmission of the new MAC PDU packet through the second CG resource, and retransmit an existing deprioritized MAC PDU through other CG resource, wherein the other CG resource is a resource other than the first CG resource in the first CG resource group;

or, in response to that the first CG resource is the deprioritized resource and a first condition is satisfied and the CGT is stopped, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied and the CGT is stopped, perform a new transmission through the second CG resource, wherein the new transmission is IIoT/URLLC autonomous transmission;

or, in response to that the first CG resource is the deprioritized resource and the CGT is stopped, perform NRU autonomous retransmission through the second CG resource;

or, in response to that the first CG resource is the deprioritized resource and the CGT is not stopped, perform NRU autonomous retransmission through the second CG resource;

or, the first CG resource belonging to the first CG resource group, and in response to that the first CG resource is the deprioritized resource and the CGT is stopped, for the first CG resource, perform NRU autonomous retransmission through the second CG resource;

or, the first CG resource belonging to the first CG resource group, and in response to that the first CG resource is the deprioritized resource and the CGT is stopped, for the first CG resource, perform NRU autonomous retransmission through the second CG resource, and retransmit an existing deprioritized MAC PDU through the other CG resource;

or, the first CG resource belonging to the first CG resource group, and in response to that the first CG resource is the deprioritized resource and the CGT is not stopped, for the first CG resource, perform NRU autonomous retransmission through the second CG resource;

or, the first CG resource belonging to the first CG resource group, and in response to that the first CG resource is the deprioritized resource and the CGT is not stopped, for the first CG resource, perform NRU autonomous retransmission through the second CG resource, and retransmit an existing deprioritized MAC PDU through the other CG resource.

Optionally, a new transmission is performed through the first CG resource.

Optionally, in response to that the first HARQ process is in a pending state, the processor 530 is configured to:

in response to that the first CG resource is the deprioritized resource, generate the new MAC PDU packet and perform a new transmission of the new MAC PDU packet through the second CG resource;

or, in response to that the first CG resource is the deprioritized resource and a first condition is satisfied, perform a new transmission through the second CG resource, wherein first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, in response to that the first HARQ process is in a not pending state, the processor 530 is configured to:

in response to that the first CG resource is the deprioritized resource, generate the new MAC PDU packet and perform a new transmission of the new MAC PDU packet through the second CG resource;

or, the first CG resource belonging to the first CG resource group, and in response to that the first CG resource is the deprioritized resource, generate the new MAC PDU packet, and perform a new transmission of the new MAC PDU packet through the second CG resource;

or the first CG resource belonging to the first CG resource group, and in response to that the first CG resource is the deprioritized resource, generate the new MAC PDU packet, and perform a new transmission of the new MAC PDU packet through the second CG resource, and retransmit an existing deprioritized MAC PDU through other CG resource;

or, in response to that the first CG resource is the deprioritized resource and the first condition is satisfied, perform a new transmission through the second CG resource;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through the other CG resource.

Optionally, retransmission is performed through the first CG resource;

wherein the processor 530 is configured to:

in response to that the first CG resource is the deprioritized resource, generate the new MAC PDU packet, and perform a new transmission of the new MAC PDU packet through the second CG resource;

or, in response to that the first CG resource is the deprioritized resource and the first condition is satisfied, perform a new transmission through the second CG resource;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, the first configuration is used to indicate:

configuring the CGT;

configuring the LCH-based prioritization;

not configuring the CGRT; and not configuring the autonomous transmission mechanism.

Optionally, the processor 530 is configured to:

in response to that the first CG resource is the deprioritized resource, stop the CGT;

or, in response to that the first CG resource is the deprioritized resource, not stop the CGT;

or, the first CG resource belonging to a first CG resource group, and in response to that the first CG resource is the deprioritized resource, stop the CGT;

or, the first CG resource belonging to the first CG resource group, and in response to that the first CG resource is the deprioritized resource, not stop the CGT;

or, in response to that the first CG resource is the deprioritized resource and a first condition is satisfied, stop the CGT, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, not stop the CGT.

Optionally, the processor 530 is configured to:

in response to that the first CG resource is the deprioritized resource, for the first CG resource, generate a new MAC PDU packet, and perform a new transmission of the new MAC PDU packet through a second CG resource, wherein a time domain position of the second CG resource is after the first CG resource, and the second CG resource is associated with a same first HARQ process as the first CG resource;

or, the first CG resource belonging to the first CG resource group, and in response to that the first CG resource is the deprioritized resource, for the first CG resource, generate a new MAC PDU packet, and perform a new transmission of new MAC PDU packet through the second CG resource;

or, the first CG resource belonging to the first CG resource group, and in response to that the first CG resource is the deprioritized resource, for the first CG resource, generate a new MAC PDU packet, and perform a new transmission of the new MAC PDU packet through the second CG resource, and retransmit an existing deprioritized MAC PDU through other CG resource, wherein the other CG resource is a CG resource other than the first CG resource in the first CG resource group;

or, in response to that the first CG resource is the deprioritized resource and a first condition is satisfied, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource and the first condition is satisfied, perform a new transmission through the second CG resource, wherein the new transmission is IIoT/URLLC autonomous transmission;

or, in response to that the first CG resource is the deprioritized resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource;

or, the first CG resource belonging to the first CG resource group, and in response to that the first CG resource is the deprioritized resource, for the first CG resource, perform NRU autonomous retransmission through the second CG resource, and retransmit an existing deprioritized MAC PDU through other CG resource.

Optionally, the processor 530 is configured to:

in response to that the first CG resource is the deprioritized resource and the CGT is stopped, for the first CG resource, generate a new MAC PDU packet, and perform a new transmission of the new MAC PDU packet through a second CG resource, wherein a time domain position of the second CG resource is after the first CG resource, and the second CG resource is associated with a same first HARQ process as the first CG resource;

or, in response to that the first CG resource is the deprioritized resource and the CGT is not stopped, for the first CG resource, generate a new MAC PDU packet and perform a new transmission through the second CG resource;

or, the first CG resource belonging to the first CG resource group, and in response to that the first CG resource is the deprioritized resource and the CGT is stopped, for the first CG resource, generate a new MAC PDU packet, and perform a new transmission of the new MAC PDU packet through the second CG resource;

or, the first CG resource belonging to the first CG resource group, and in response to that the first CG resource is the deprioritized resource and the CGT is stopped, for the first CG resource, generate a new MAC PDU packet, perform a new transmission of the new MAC PDU packet through the second CG resource, and retransmit an existing deprioritized MAC PDU through other CG resource, wherein the other CG resource is a CG resource other than the first CG resource in the first CG resource group;

or, the first CG resource belonging to the first CG resource group, and in response to that the first CG resource is the deprioritized resource and the CGT is not stopped, for the first CG resource, generate a new MAC PDU packet, and perform a new transmission of the new MAC PDU packet through the second CG resource;

or, the first CG resource belonging to the first CG resource group, and in response to that the first CG resource is the deprioritized resource and the CGT is not stopped, for the first CG resource, generate a new MAC PDU packet, perform a new transmission of the new MAC PDU packet through the second CG resource, and retransmit an existing deprioritized MAC PDU through the other CG resource;

or, in response to that the first CG resource is the deprioritized resource, a first condition is satisfied, and the CGT is stopped, perform a new transmission through the second CG resource, wherein the first condition includes but is not limited to at least one of the following that:

a MAC PDU is obtained, there is at least one corresponding PUSCH that is not completely transmitted, and there is no corresponding PUSCH that is completely transmitted;

or, in response to that the first CG resource is the deprioritized resource, the first condition is satisfied, and the CGT is stopped, perform a new transmission through the second CG resource, wherein the new transmission is IIoT/URLLC autonomous transmission;

or, in response to that the first CG resource is the deprioritized resource, the first condition is satisfied, and the CGT is not stopped, perform a new transmission through the second CG resource;

or, in response to that the first CG resource is the deprioritized resource, the first condition is satisfied, and the CGT is not stopped, perform a new transmission through the second CG resource, wherein the new transmission is IIoT/URLLC autonomous transmission;

or, in response to that the first CG resource is the deprioritized resource and the CGT is stopped, perform NRU autonomous retransmission through the second CG resource;

or, in response to that the first CG resource is the deprioritized resource and the CGT is not stopped, perform NRU autonomous retransmission through the second CG resource;

or, in response to that the first CG resource belonging to the first CG resource group, in response to that the first CG resource is the deprioritized resource and the CGT is stopped, for the first CG resource, perform NRU autonomous retransmission through the second CG resource;

or, in response to that the first CG resource belonging to the first CG resource group, in response to that the first CG resource is the deprioritized resource and the CGT is stopped, for the first CG resource, perform NRU autonomous retransmission through the second CG resource, and retransmit an existing deprioritized MAC PDU through the other CG resource;

or, in response to that the first CG resource belonging to the first CG resource group, in response to that the first CG resource is the deprioritized resource and the CGT is not stopped, for the first CG resource, perform NRU autonomous retransmission through the second CG resource;

or, in response to that the first CG resource belonging to the first CG resource group, in response to that the first CG resource is the deprioritized resource and the CGT is not stopped, for the first CG resource, perform NRU autonomous retransmission through the second CG resource, and retransmit an existing deprioritized MAC PDU through the other CG resource.

Optionally, a new transmission is performed through the first CG resource, or a retransmission is performed through the first CG resource.

Optionally, the first CG resource being the deprioritized resource, includes:

the first CG resource being determined to be a deprioritized CG resource due to LCH-based prioritization; or, the first CG resource being determined to be a deprioritized CG resource due to a cancellation indication Radio Network Temporary Identifier (CI-RNTI) value; or, the first CG resource being determined to be a deprioritized CG resource due to a conflict between the first CG resource and a high-priority Physical Uplink Control Channel (PUCCH) resource; or, the first CG resource being determined to be a deprioritized CG resource due to a conflict between the first CG resource and a high-priority PUSCH; or, the first CG resource being determined to be a deprioritized CG resource due to a priority indication from a physical layer.

Figure 6:
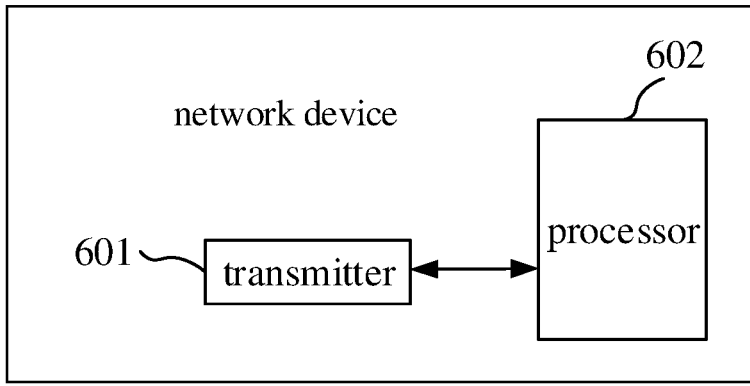
FIG. 6 is a schematic diagram of a hardware structure of a network device provided by an embodiment of the present disclosure.

Exemplarily, as shown in FIG. 6, the network device according to an embodiment of the present disclosure may be a base station. The base station may include a transmitter 601 and a processor 602.

The transmitter 601 is configured to send first configuration information to a terminal device, wherein the first configuration information is used for a Configured Grant (CG) resource transmission mode and/or a CG Timer (CGT) state.

Optionally, the first configuration information is used to indicate at least one of the following:

configuring at least one CG resource;

configuring a CGT;

configuring Logical Channel (LCH)-based prioritization, or not configuring the LCH-based prioritization;

configuring a CG retransmission timer (CGRT), or not configuring the CGRT; or configuring an autonomous transmission mechanism, or not configuring the autonomous transmission mechanism.

Optionally, the first configuration information is used to determine the CG resource transmission mode and/or the CGT state when the first CG resource is a deprioritized resource;

wherein the first CG resource is one CG resource in the at least one CG resource.

Optionally, the first configuration information is used to indicate:

configuring the CGT;

configuring the LCH-based prioritization;

configuring the CGRT; and not configuring the autonomous transmission mechanism.

Optionally, the first configuration information is used to indicate:

configuring the CGT;

configuring the LCH-based prioritization;

configuring the CGRT; and configuring the autonomous transmission mechanism.

Optionally, the first configuration information is used to indicate:

configuring the CGT;

configuring the LCH-based prioritization;

not configuring the CGRT; and not configuring the autonomous transmission mechanism.

Optionally, the first CG resource being the deprioritized resource, includes:

the first CG resource being determined to be a deprioritized CG resource due to LCH-based prioritization; or, the first CG resource being determined to be a deprioritized CG resource due to a cancellation indication Radio Network Temporary Identifier (CI-RNTI) value; or, the first CG resource being determined to be a deprioritized CG resource due to a conflict between the first CG resource and a high-priority Physical Uplink Control Channel (PUCCH) resource; or, the first CG resource being determined to be a deprioritized CG resource due to a conflict between the first CG resource and a high-priority PUSCH; or, the first CG resource being determined to be a deprioritized CG resource due to a priority indication from a physical layer.

An embodiment of the present disclosure also provides a computer-readable storage medium, including computer instructions, which when run on a computer, cause the computer to perform various processes of the terminal device in the foregoing method embodiments.

An embodiment of the present disclosure also provides a computer-readable storage medium, including computer instructions, which when run on a computer, cause the computer to perform various processes of the network device in the foregoing method embodiments.

An embodiment of the present disclosure also provides a computer program product, including computer instructions. When the computer program product runs on a computer, the computer runs the computer instructions, so that the computer performs various processes of the terminal device in the above method embodiments.

An embodiment of the present disclosure also provides a computer program product, including computer instructions. When the computer program product runs on the computer, the computer runs the computer instructions, so that the computer performs various processes of the network device in the above method embodiments.

An embodiment of the present disclosure also provides a chip, and the chip is coupled with a memory in the terminal device, so that the chip invokes program instructions stored in the memory during operation, to cause the terminal device to perform various processes of the terminal device in the above method embodiments.

An embodiment of the present disclosure also provides a chip, and the chip is coupled with a memory in the network device, so that the chip invokes program instructions stored in the memory during operation, to cause the network device to perform various processes of the network device in the above method embodiments.

The above embodiments may be implemented in whole or in part by software, hardware, firmware or any combination thereof. When implemented using software, the embodiments may be implemented in whole or in part in the form of a computer program product. A computer program product includes one or more computer instructions. When the computer program instructions are loaded and executed on a computer, the processes or functions according to the embodiments of the present disclosure are produced in whole or in part. A computer can be a general purpose computer, a special purpose computer, a computer network, or other programmable device. Computer instructions may be stored in a computer-readable storage medium, or may be transmitted from one computer-readable storage medium to another computer-readable storage medium. For example, computer instructions may be transmitted from a website site, computer, server or data center in a wire manner (e.g., coaxial cable, optical fiber, digital subscriber line (DSL)) or in a wireless manner (e.g., infrared, wireless, microwave, etc.) to another website site, computer, server, or data center. The computer-readable storage medium may be any available medium that can be accessed by a computer, or a data storage device such as a server, a data center, and so on, which is integrated with one or more available mediums. The available medium may be magnetic medium (e.g., floppy disk, hard disk, magnetic tape), optical medium (e.g., DVD), or semiconductor medium (e.g., Solid State Disk (SSD)).

The terms "first", "second", "third", "fourth", etc. (if exist) in the description and claims of the present disclosure and the drawings are used to distinguish similar objects, and not necessarily used to describe a specific sequence or order. It is to be understood that the terms so used are interchangeable under appropriate circumstances such that the embodiments described herein can be practiced in sequences other than those illustrated or described herein. Furthermore, the terms "comprising" and "having" as well as any variations thereof, are intended to cover a non-exclusive inclusion. For example, a process, a method, a system, a product or a device comprising a series of steps or elements is not necessarily limited to the expressly listed steps or elements, but may include other steps or elements which hare not explicitly listed or are inherent to the process, method, product or device.

What is claimed is:

1. A CG resource processing method, comprising:

receiving first configuration information sent by a network device; and according to the first configuration information, determining a Configured Grant (CG) resource transmission mode, and determining a CG Timer (CGT) state;

wherein the first configuration information is used to indicate:

configuring at least one CG resource;

configuring a CGT;

configuring Logical Channel (LCH)-based prioritization, or not configuring the LCH-based prioritization;

configuring a CG retransmission timer (CGRT), and configuring an autonomous transmission mechanism;

wherein determining the CG resource transmission mode and determining the CGT state according to the first configuration information, comprises:

in response to that a first CG resource is a deprioritized resource, according to the first configuration information, determining the CG resource transmission mode and determining the CGT state;

wherein the first CG resource is one CG resource in the at least one CG resource;

wherein determining the CGT state according to the first configuration information in response to that the first CG resource is the deprioritized resource comprises:

in response to that the first CG resource is the deprioritized resource, stopping the CGT;

wherein determining the CG resource transmission mode according to the first configuration information in response to that the first CG resource is the deprioritized resource comprises:

in response to that the first CG resource is the deprioritized resource, generating a new Medium Access Control (MAC) Protocol Data Unit (PDU) packet, and performing a new transmission of the new MAC PDU packet through a second CG resource, wherein a time domain position of the second CG resource is after the first CG resource, and the second CG resource is associated with a same first Hybrid Automatic Repeat Request (HARQ) process as the first CG resource;

wherein a new transmission is performed through the first CG resource;

wherein in response to that the first HARQ process is in a pending state and the first HARQ process is a HARQ process associated with the first CG resource and the second CG resource, determining the CG resource transmission mode according to the first configuration information in response to that the first CG resource is the deprioritized resource, comprises:

in response to that the first CG resource is the deprioritized resource, generating the new MAC PDU packet and performing a new transmission of the new MAC PDU packet through the second CG resource;

or, in response to that the first CG resource is the deprioritized resource and a first condition is satisfied, performing a new transmission through the second CG resource, wherein first condition comprises at least one of the following that:

a MAC PDU is obtained, there is at least one corresponding PUSCH that is not completely transmitted, or there is no corresponding PUSCH that is completely transmitted;

or, wherein in response to that the first HARQ process is in a not pending state and the first HARQ process is a HARQ process associated with the first CG resource and the second CG resource, determining the CG resource transmission mode according to the first configuration information in response to that the first CG resource is the deprioritized resource, comprises:

in response to that the first CG resource is the deprioritized resource, generating the new MAC PDU packet and performing a new transmission of the new MAC PDU packet through the second CG resource;

or, in response to that the first CG resource is the deprioritized resource and the first condition is satisfied, performing a new transmission through the second CG resource.

2. The method according to claim 1, wherein determining the CG resource transmission mode according to the first configuration information in response to that the first CG resource is the deprioritized resource comprises:

the first CG resource belonging to a first CG resource group, and in response to that the first CG resource is the deprioritized resource and the CGT is stopped, generating a new MAC PDU packet, and performing a new transmission of the new MAC PDU packet through the second CG resource;

or;

the first CG resource belonging to the first CG resource group, and in response to that the first CG resource is the deprioritized resource and the CGT is stopped, generating a new MAC PDU packet, and performing a new transmission of the new MAC PDU packet through the second CG resource, and retransmitting an existing deprioritized MAC PDU through other CG resource, wherein the other CG resource is a resource other than the first CG resource in the first CG resource group.

57 58

3. A terminal device, comprising:

a processor; and a memory storing instructions executable by the processor;

wherein when the instructions are executed by the processor, the terminal device is caused to:

receive first configuration information sent by a network device; and according to the first configuration information, determine a Configured Grant (CG) resource transmission mode, and determine a CG Timer (CGT) state;

wherein the first configuration information is used to indicate:

configuring at least one CG resource;

configuring a CGT;

configuring Logical Channel (LCH)-based prioritization, or not configuring the LCH-based prioritization;

configuring a CG retransmission timer (CGRT), and configuring an autonomous transmission mechanism;

wherein when the instructions are executed by the processor, the terminal device is caused to:

in response to that a first CG resource is a deprioritized resource, according to the first configuration information, determine the CG resource transmission mode and determining the CGT state;

wherein the first CG resource is one CG resource in the at least one CG resource;

wherein when the instructions are executed by the processor, the terminal device is caused to:

in response to that the first CG resource is the deprioritized resource, stop the CGT;

wherein when the instructions are executed by the processor, the terminal device is caused to:

in response to that the first CG resource is the deprioritized resource, generate a new Medium Access Control (MAC) Protocol Data Unit (PDU) packet, and perform a new transmission of the new MAC PDU packet through a second CG resource, wherein a time domain position of the second CG resource is after the first CG resource, and the second CG resource is associated with a same first Hybrid Automatic Repeat Request (HARQ) process as the first CG resource;

wherein a new transmission is performed through the first CG resource;

wherein in response to that the first HARQ process is in a pending state and the first HARQ process is a HARQ process associated with the first CG resource and the second CG resource, determining the CG resource transmission mode according to the first configuration information in response to that the first CG resource is the deprioritized resource, comprises:

in response to that the first CG resource is the deprioritized resource, generating the new MAC PDU packet and performing a new transmission of the new MAC PDU packet through the second CG resource;

or, in response to that the first CG resource is the deprioritized resource and a first condition is satisfied, performing a new transmission through the second CG resource, wherein first condition comprises at least one of the following that:

a MAC PDU is obtained, there is at least one corresponding PUSCH that is not completely transmitted, or there is no corresponding PUSCH that is completely transmitted;

or, wherein in response to that the first HARQ process is in a not pending state and the first HARQ process is a HARQ process associated with the first CG resource and the second CG resource, determining the CG resource transmission mode according to the first configuration information in response to that the first CG resource is the deprioritized resource, comprises:

in response to that the first CG resource is the deprioritized resource, generating the new MAC PDU packet and performing a new transmission of the new MAC PDU packet through the second CG resource;

or, in response to that the first CG resource is the deprioritized resource and the first condition is satisfied, performing a new transmission through the second CG resource.

4. The terminal device according to claim 3, wherein when the instructions are executed by the processor, the terminal device is caused to:

the first CG resource belonging to a first CG resource group, and in response to that the first CG resource is the deprioritized resource and the CGT is stopped, generate a new MAC PDU packet, and perform a new transmission of the new MAC PDU packet through the second CG resource;

or;

the first CG resource belonging to the first CG resource group, and in response to that the first CG resource is the deprioritized resource and the CGT is stopped, generate a new MAC PDU packet, and perform a new transmission of the new MAC PDU packet through the second CG resource, and retransmit an existing deprioritized MAC PDU through other CG resource, wherein the other CG resource is a resource other than the first CG resource in the first CG resource group.

5. A network device, comprising:

a processor; and a memory storing instructions executable by the processor;

wherein when the instructions are executed by the processor, the network device is caused to:

send first configuration information to a terminal device, wherein the first configuration information is used for a Configured Grant (CG) resource transmission mode and a CG Timer (CGT) state;

wherein the first configuration information is used to indicate:

configuring at least one CG resource;

configuring a CGT;

configuring Logical Channel (LCH)-based prioritization, or not configuring the LCH-based prioritization;

configuring a CG retransmission timer (CGRT), and configuring an autonomous transmission mechanism;

wherein the first configuration information is used for the terminal device to:

in response to that a first CG resource is a deprioritized resource, according to the first configuration information, determine the CG resource transmission mode and determining the CGT state;

wherein the first CG resource is one CG resource in the at least one CG resource;

wherein the first configuration information is used for the terminal device to:

in response to that the first CG resource is the deprioritized resource, stop the CGT;

wherein the first configuration information is used for the terminal device to:

in response to that the first CG resource is the deprioritized resource, generate a new Medium Access Control (MAC) Protocol Data Unit (PDU) packet, and perform a new transmission of the new MAC PDU packet through a second CG resource, wherein a time domain position of the second CG resource is after the first CG resource, and the second CG resource is associated with a same first Hybrid Automatic Repeat Request (HARQ) process as the first CG resource;

wherein a new transmission is performed through the first CG resource;

wherein in response to that the first HARQ process is in a pending state and the first HARQ process is a HARQ process associated with the first CG resource and the second CG resource, the first configuration information is used for the terminal device to:

in response to that the first CG resource is the deprioritized resource, generate the new MAC PDU packet and perform a new transmission of the new MAC PDU packet through the second CG resource;

or, in response to that the first CG resource is the deprioritized resource and a first condition is satisfied, perform a new transmission through the second CG resource, wherein first condition comprises at least one of the following that:

a MAC PDU is obtained, there is at least one corresponding PUSCH that is not completely transmitted, or there is no corresponding PUSCH that is completely transmitted;

or, wherein in response to that the first HARQ process is in a not pending state and the first HARQ process is a HARQ process associated with the first CG resource and the second CG resource, the first configuration information is used for the terminal to:

in response to that the first CG resource is the deprioritized resource, generate the new MAC PDU packet and perform a new transmission of the new MAC PDU packet through the second CG resource;

or, in response to that the first CG resource is the deprioritized resource and the first condition is satisfied, perform a new transmission through the second CG resource.

\* \* \* \* \*